(12) United States Patent
Ksairi et al.

(10) Patent No.: US 12,335,077 B2
(45) Date of Patent: Jun. 17, 2025

(54) PROJECTED SIGNALS USING DISCRETE PROLATE SPHEROIDAL SEQUENCES

(71) Applicant: HUAWEI TECHNOLOGIES CO., LTD., Guangdong (CN)

(72) Inventors: Nassar Ksairi, Boulogne Billancourt (FR); Merouane Debbah, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 35 days.

(21) Appl. No.: 18/517,880

(22) Filed: Nov. 22, 2023

(65) Prior Publication Data
US 2024/0097956 A1 Mar. 21, 2024

Related U.S. Application Data

(63) Continuation of application No. PCT/EP2021/064022, filed on May 26, 2021.

(51) Int. Cl.
H04L 27/26 (2006.01)
(52) U.S. Cl.
CPC .... *H04L 27/26035* (2021.01); *H04L 27/2628* (2013.01)
(58) Field of Classification Search
CPC ........... H04L 27/26035; H04L 27/2628; H04L 27/2639; H04L 27/2602; H04L 27/264; H04L 27/2634; H04L 27/2627
See application file for complete search history.

(56) References Cited

U.S. PATENT DOCUMENTS

| 10,382,233 | B2 | 8/2019 | Abdelghaffar et al. | |
| 2003/0236072 | A1* | 12/2003 | Thomson | H04L 25/0202 455/63.1 |
| 2016/0261449 | A1* | 9/2016 | Yang | H04L 27/2646 |
| 2018/0270027 | A1 | 9/2018 | Ma et al. | |
| 2023/0403189 | A1* | 12/2023 | Ksairi | H04L 27/2607 |
| 2024/0113922 | A1* | 4/2024 | Tourki | H04L 25/0224 |

OTHER PUBLICATIONS

Farhang-Boroujeny, "OFDM Versus Filter Bank Multicarrier," IEEE Signal Processing Magazine, May 2011, 21 pages.
(Continued)

*Primary Examiner* — Khanh C Tran
(74) *Attorney, Agent, or Firm* — Fish & Richardson P.C.

(57) ABSTRACT

A device may obtain a sequence of input samples. The device may further obtain a first set of sequences, which may be based on discrete prolate spheroidal sequences associated with eigenvalues having a value larger than a first threshold. The device may determine a first projected sample sequence comprising a projection of the sequence of input samples to the first set of sequences and generate a signal based on the first projected sample sequence. Another device may determine a window of received samples of the signal and project the window of received samples to the first set of sequences or filter the window of received samples to obtain a first sample sequence. The detection of the received signal may then be performed based on the first sample sequence.

20 Claims, 9 Drawing Sheets

(56) References Cited

OTHER PUBLICATIONS

Karnik et al., "Fast Computations For Approximation And Compression In Slepian Spaces," Proceedings of 2016 IEEE Global Conference On Signal And Information Processing (GLOBALSIP), Dec. 7, 2016, pp. 1359-1363.
Vakilian et al., "Universal-Filtered Multi-Carrier Technique for Wireless Systems Beyond LTE," Proceedings of IEEE Globecom, Atlanta, Dec. 2013, 6 pages.
Zhang et al., "Filtered-OFDM—Enabler for Flexible Waveform in the 5th Generation Cellular Networks," IEEE Globecom, San Diego, CA, Dec. 2015, 6 pages.
Wang et al., "Closed-Form Expressions for ICI/ISI in Filtered OFDM Systems for Asynchronous 5G Uplink," IEEE Transactions on Communications, Nov. 2017, 13 pages.
Vaezi et al., "Multiple Access Techniques for 5G Wireless Networks and Beyond," Springer, 2019, 692 pages.
Slepian et al., "Prolate spheroidal wave functions, Fourier analysis and uncertainty-I," Bell System Technology Journal, Jan. 1961, 21 pages.
Slepian, "Prolate spheroidal wave functions, Fourier analysis, and uncertainty—V: The discrete case," Bell Systems Technical Journal, May-Jun. 1978, 60 pages.
Sigloch et al., "Communication Over Nonstationary Nonflat Wireless Channels," IEEE Transactions On Signal Processing, vol. 53, No. 6, Jun. 2005, 12 pages.
Yang et al., "A new waveform based on Slepian basis for 5G system," 2016 Wireless Days (WD), Mar. 2016, 4 pages.
Karnik et al., "The fast Slepian transform," Applied and Computational Harmonic Analysis, vol. 46, No. 3, May 2019, pp. 624-652.
Zhu et al., "ROAST: Rapid Orthogonal Approximate Slepian Transform," IEEE Transactions on Signal Processing, Nov. 2018, 15 pages.
Dahlman et al., "4G, LTE-Advanced Pro and The Road to 5G Third Edition," Academic Press, Jul. 2016, 587 pages.
International Search Report and Written Opinion in International Appln. No. PCT/EP2021/064022, mailed on Feb. 18, 2022, 16 pages.

* cited by examiner

Transmitted signal

PROJECTED SIGNALS USING DISCRETE PROLATE SPHEROIDAL SEQUENCES

CROSS-REFERENCE TO RELATED APPLICATIONS

This application is a continuation of International Application No. PCT/EP2021/064022, filed on May 26, 2021, the disclosure of which is hereby incorporated by reference in its entirety.

BACKGROUND

Wireless communications signals may be transmitted on dedicated radio frequencies and, in some applications, it may be desired to generate signals that are spectrally well-contained, for example to avoid excessive interference between signals on neighbouring frequencies or signals within a single communication system due to out-of-band (OOB) emissions. Wireless communications may be based on single-tone transmission comprising modulation of a single-carrier waveform, multi-carrier transmission comprising modulation of multiple subcarriers, for example, by means of an inverse fast Fourier transform (IFFT), or multi-chirp transmission comprising modulation of multiple chirp waveforms, for example, by means of an inverse discrete affine Fourier transform (IDAFT).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an objective of the present disclosure to enable the generation and reception of signals with reduced out-of-band emissions. The foregoing and other objectives may be achieved by the features of the independent claims. Further implementation forms are apparent from the dependent claims, the description, and the drawings.

According to a first aspect, a device for generating a signal is provided. The device may be configured to obtain a sequence of input samples and obtain a first set of sequences. The first set of sequences may be based on discrete prolate spheroidal sequences associated with eigenvalues having a value larger than a first threshold. The device may be further configured to determine a first projected sample sequence comprising a projection of the sequence of input samples to the first set of sequences and generate the signal based on the first projected sample sequence. This solution enables the generation of spectrally well-contained signals with reduced out-of-band emissions.

According to an implementation form of the first aspect, the device may be further configured to obtain a second set of sequences. The second set of sequences may be based on discrete prolate spheroidal sequences associated with eigenvalues having a value between the first threshold and a second threshold. To determine the first projected sample sequence, the device may be further configured to: determine a second projected sample sequence comprising a projection of the sequence of input samples to the second set of sequences and subtract the second projected sample sequence from the sequence of input samples. This solution reduces the complexity of generating spectrally well-contained signals.

According to an implementation form of the first aspect, the first threshold may be $1-\epsilon$ and the second threshold may be $\epsilon$, where $\epsilon$ is between 0 and ½. This solution provides an implementation for generating spectrally well-contained signals with a reduced complexity based on the first and second thresholds for the eigenvalues.

According to an implementation form of the second aspect, the first set of sequences or the second set of sequences may comprise frequency-shifted discrete prolate spheroidal sequences. This solution enables the generation of spectrally well-contained signals that are centered on a non-zero frequency.

According to an implementation form of the first aspect, the discrete prolate spheroidal sequences may comprise eigenvectors of a prolate matrix $B_{N,W}$, where elements (m, n) of the prolate matrix $B_{N,W}$ are:

$$[B_{N,W}]_{m,n} = \frac{\sin 2\pi W(m-n)}{\pi(m-n)},$$

where $(m, n) \in \{1, \ldots, N\}^2$, N is a length of the sequence of input samples, and W is an intended bandwidth of the signal, where W is between 0 and ½. This solution enables the generation of spectrally well-contained signals based on discrete prolate spheroidal sequences having a particular bandwidth W.

According to an implementation form of the first aspect, a bandwidth of the first set of sequences may comprise a bandwidth excess with respect to an intended bandwidth of the signal. This solution allows to mitigate distortion caused by the projection of the sequence of input samples to the first set of sequences.

According to an implementation form of the first aspect, the discrete prolate spheroidal sequences may comprise eigenvectors of a prolate matrix $B_{N,W+\Delta W}$, where elements (m, n) of the prolate matrix $B_{N,W+\Delta W}$ are:

$$[B_{N,W+\Delta W}]_{m,n} = \frac{\sin 2\pi(W+\Delta W)(m-n)}{\pi(m-n)},$$

where $(m, n) \in \{1, \ldots, N\}^2$, N is a length of the sequence of input samples, W is the intended bandwidth of the signal, where W is between 0 and ½, and $\Delta W$ is the bandwidth excess. This solution enables the generation of spectrally well-contained signals based on discrete prolate spheroidal sequences including the a particular bandwidth excess $\Delta W$.

According to an implementation form of the first aspect, the device may be further configured to apply a transmit transform to a sequence of data symbols to obtain the sequence of input samples. This solution improves spectral containment of signals generated based on a transmit transform.

According to an implementation form of the first aspect, the transmit transform may comprise an inverse discrete Fourier transform or an inverse discrete affine Fourier transform. This solution allows to generate multi-carrier signals or multi-chirp signals with improved spectral containment.

According to an implementation form of the first aspect, the sequence of data symbols may comprise guard symbols at edges of the sequence of data symbols. This solution allows to mitigate distortion caused by the projection of the sequence of input samples to the first set of sequences.

According to an implementation form of the first aspect, the device may be further configured to insert a cyclic prefix or a chirp periodic prefix to the sequence of input samples. This solution enables a receiver to cope with a delay spread of a wireless radio channel.

According to an implementation form of the first aspect, the device may be further configured to insert zero-valued tail samples at edges of the sequence of input samples. This solution allows to mitigate a distortion caused by the projection of the sequence of input samples to the first set of sequences.

According to an implementation form of the first aspect, the device may be further configured to overlap and add tails of the first projected sample sequence with a preceding projected sequence of input samples and a subsequent projected sequence of input samples. This solution allows to mitigate a distortion caused by the projection of the sequence of input samples to the first set of sequences without reducing spectral efficiency.

According to an implementation form of the first aspect, the device may be further configured to insert a zero-valued suffix to the first projected sample sequence. This solution enables a receiver to cope with a delay spread of a wireless radio channel.

According to an implementation form of the first aspect, the device may be further configured to transmit at least one of: an indication of the bandwidth excess; an indication of a number of the guard symbols; and an indication of a number of the zero-valued tail samples. This solution enables an adaptation of the bandwidth excess, the number of guard symbols, or the number of zero-valued tail symbols during operation, for example to optimize transmission for different radio channel conditions or communication system configurations.

According to an implementation form of the first aspect, the device may be further configured to receive an indication of a length of a window of received samples configured at a receiver; and determine at least one of the bandwidth excess, the number of the guard symbols, and the number of the zero-valued tail symbols based on the length of the window of received samples configured at the receiver. This solution enables an adaptation of the bandwidth excess, number of guard symbols, or number of zero-valued tail symbols for a particular receiver.

According to an implementation form of the first aspect, the device may be further configured to transmit the generated signal. This solution allows the generated spectrally well-contained signal to be conveyed to a receiver.

According to a second aspect, a device for receiving a signal is disclosed. The device may be configured to determine a window of received samples of the received signal. The received signal may comprise a projection of a sequence of input samples to a first set of sequences. The first set of sequences may be based on discrete prolate spheroidal sequences associated with eigenvalues having a value larger than a first threshold. The device may be further configured to project the window of received samples to the first set of sequences or filter the window of received samples to obtain a first sample sequence, and perform a detection of the received signal based on the first sample sequence. This solution enables the reception of spectrally well-contained signals with reduced out-of-band emissions while attenuating an interference to this reception from signals occupying adjacent frequency bands i.e., out-of-band interference.

According to an implementation form of the second aspect, to project the window of received samples to the first set of sequences, the device is further configured to: determine a second projected sample sequence comprising a projection of the window of received samples to a second set of sequences, wherein the second set of sequences is based on discrete prolate spheroidal sequences associated with eigenvalues having a value between the first threshold and a second threshold; and subtract the second projected sample sequence from the window of received samples. This solution reduces the complexity of receiving spectrally well-contained signals.

According to an implementation form of the second aspect, the first threshold may be $1-\epsilon$ and the second threshold may be $\epsilon$, where $\epsilon$ is between 0 and ½. This solution provides an implementation for receiving spectrally well-contained signals with reduced complexity based on the first and second thresholds for the eigenvalues.

According to an implementation form of the first aspect, the first set of sequences or the second set of sequences may comprise frequency-shifted discrete prolate spheroidal sequences. This solution enables the reception of spectrally well-contained signals that are centered on a non-zero frequency.

According to an implementation form of the second aspect, the discrete prolate spheroidal sequences may comprise eigenvectors of a prolate matrix $B_{N,W}$, where elements (m, n) of the prolate matrix $B_{N,W}$ are:

$$[B_{N,W}]_{m,n} = \frac{\sin 2\pi W(m-n)}{\pi(m-n)},$$

where $(m, n) \in \{1, \ldots, N\}^2$, N is a length of the sequence of input samples, and W is an intended bandwidth of the signal, where W is between 0 and ½. This solution enables the reception of spectrally well-contained signals based on discrete prolate spheroidal sequences having a particular bandwidth W.

According to an implementation form of the second aspect, a bandwidth of the first set of sequences may comprise a bandwidth excess with respect to an intended bandwidth of the signal. This solution allows to mitigate distortion caused by the projection of the sequence of input samples to the first set of sequences.

According to an implementation form of the second aspect, the discrete prolate spheroidal sequences may comprise eigenvectors of a prolate matrix $B_{N,W+\Delta W}$, where elements (m, n) of the prolate matrix $B_{N,W+\Delta W}$ are:

$$[B_{N,W+\Delta W}]_{m,n} = \frac{\sin 2\pi(W+\Delta W)(m-n)}{\pi(m-n)},$$

where $(m, n) \in \{1, \ldots, N\}^2$, N is a length of the sequence of input samples, W is the intended bandwidth of the signal, where W is between 0 and ½, and $\Delta W$ is the bandwidth excess. This solution enables the reception of spectrally well-contained signals based on discrete prolate spheroidal sequences including the bandwidth excess $\Delta W$.

According to an implementation form of the second aspect, a length of the window of received samples may be higher or equal to a length of the sequence of input samples. This solution enables attenuating out-of-band interference.

According to an implementation form of the second aspect, the device may be further configured to: apply a receive transform to the first sample sequence to obtain a transformed sample sequence; and perform the detection of the received signal based on the transformed sample sequence. This solution enables the reception of signals generated based on a transmit transform and having improved spectral containment.

According to an implementation form of the second aspect, the receive transform may comprise an inverse discrete Fourier transform or an inverse discrete affine Fourier transform. This solution enables the reception of multi-carrier signals or multi-chirp signals with improved spectral containment.

According to an implementation form of the second aspect, the device may be further configured to remove symbols corresponding to guard symbols from the transformed sample sequence. This solution allows to mitigate a distortion caused by the projection of the sequence of input samples to the first set of sequences.

According to an implementation form of the second aspect, the device may be further configured to remove samples corresponding to zero-valued tail samples of the sequence of input samples from edges of the first sample sequence. This solution allows to mitigate a distortion caused by the projection of the sequence of input samples to the first set of sequences.

According to an implementation form of the second aspect, the device may be further configured to remove samples corresponding to a cyclic prefix or a chirp periodic prefix of the sequence of input samples from the first sample sequence. This solution enables the device to cope with a delay spread of a wireless radio channel.

According to an implementation form of the second aspect, the device may be further configured to remove samples corresponding to a zero-valued suffix from the first sample sequence. This solution enables the device to cope with a delay spread of a wireless radio channel.

According to an implementation form of the second aspect, the device may be further configured to overlap and add samples of the first sample sequence corresponding to a zero-valued suffix with samples at an opposite edge of the first sample sequence. This solution enables the device to cope with a delay spread of a wireless radio channel.

According to an implementation form of the second aspect, the device may be further configured to: filter the window of received samples to obtain the first sample sequence based on a concatenation of an $N_w$-point discrete Fourier transform and an $N_w$-point inverse discrete Fourier transform, where $N_w > N + N_{CP/ZP}$, wherein N, is a length of the window of received samples, Nis a length of the sequence of input samples, and $N_{CP/ZP}$ is a length of a cyclic prefix or a zero-valued suffix; and set symbols at frequency tones corresponding to interfering signals to zero at the output of the $N_w$-point discrete Fourier transform. This solution allows to attenuate with a relatively low computational complexity out-of-band interference for projected single-tone signals or for any projected signal that requires low-complexity receivers.

According to an implementation form of the second aspect, the device may be further configured to receive at least one of: an indication of the bandwidth excess; an indication of a number of the guard symbols; and an indication of a number of the zero-valued tail samples. This solution enables an adaptation of the bandwidth excess, number of guard symbols, or number of zero-valued tail symbols during operation, for example to optimize transmission for different radio channel conditions or communication system configurations.

According to an implementation form of the second aspect, the device may be further configured to transmit an indication of a length of the window of received samples. This solution enables an adaptation of the bandwidth excess, the number of guard symbols, or the number of zero-valued tail symbols for the device.

According to a third aspect, a method is disclosed. The method may comprise obtaining a sequence of input samples and obtaining a first set of sequences. The first set of sequences may be based on discrete prolate spheroidal sequences associated with eigenvalues having a value larger than a first threshold. The method may further comprise determining a first projected sample sequence comprising a projection of the sequence of input samples to the first set of sequences and generating the signal based on the first projected sample sequence. This solution enables the generation of spectrally well-contained signals with reduced out-of-band emissions.

According to a fourth aspect, a method is disclosed. The method may comprise determining a window of received samples of the signal. The signal may comprise a projection of a sequence of input samples to a first set of sequences. The first set of sequences may be based on discrete prolate spheroidal sequences associated with eigenvalues having a value larger than a first threshold. The method may further comprise projecting the window of received samples to the first set of sequences or filtering the window of received samples to obtain a first sample sequence and performing a detection of the received signal based on the first sample sequence. This solution enables the reception of spectrally well-contained signals with reduced out-of-band emissions while attenuating an interference to this reception from signals occupying adjacent frequency bands.

According to a fifth aspect, a computer program is provided. The computer program may comprise program code configured to cause performance of any implementation form of the method of the third or fourth aspect, when the computer program is executed on a computer.

Implementation forms of the present disclosure can thus provide devices, methods, and computer programs for generating or receiving projected waveform(s). Any implementation form may be combined with one or more other implementation forms. These and other aspects of the present disclosure will be apparent from the example embodiment(s) described below.

DESCRIPTION OF THE DRAWINGS

The accompanying drawings, which are included to provide a further understanding of the example embodiments and constitute a part of this specification, illustrate example embodiments and, together with the description, help to explain the example embodiments. In the drawings.

Like references are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present embodiments and is not intended to represent the only forms in which the present examples may be constructed or utilized. The description sets forth the functions of the examples and the sequence of operations for constructing and operating the examples. However, the same or equivalent functions and sequences may be accomplished by different examples.

In some applications, it may be beneficial to make wireless communications signals spectrally well-contained, for example, since the available spectrum for communications may have 'holes' desired to be protected from radio interference or since services with different requirements and transmission characteristics may be accommodated on neighbouring frequency bands. On the other hand, it may be desired to increase a spectral efficiency by reducing an overhead of guard bands between different signals. Therefore, embodiments of the present disclosure provide multi-carrier, multi-chirp, and single-tone waveforms that are compatible with the above requirements while enabling a transmission and detection with a low complexity. The disclosed waveforms may be generated based on an exact or approximate orthogonal projection of the signal of each symbol of the multi-carrier, multi-chirp or single-tone communications signal on a span of a subset of the Slepian basis that is associated with the length and the intended bandwidth of the signal, as will be further described below.

According to an embodiment, a device may obtain a sequence of input samples. The device may further obtain a first set of sequences, which may be based on discrete prolate spheroidal sequences associated with eigenvalues having a value larger than a first threshold. Hence, the first set of sequences is spectrally well-contained. The device may determine a first projected sample sequence comprising a projection of the sequence of input samples to the first set of sequences and generate a signal based on the first projected sample sequence. This allows to generate a modulated signal with a good spectral containment and, therefore, a spectral efficiency of data transmission efficiency may be improved. Another device may determine a window of received samples of the signal and project the window of received samples to the first set of sequences or filter the window of received samples to obtain a first sample sequence. A detection of the received signal may then be performed based on the first sample sequence. This enables a reception of the spectrally well-contained signal with an improved reception performance.

Figure 1:
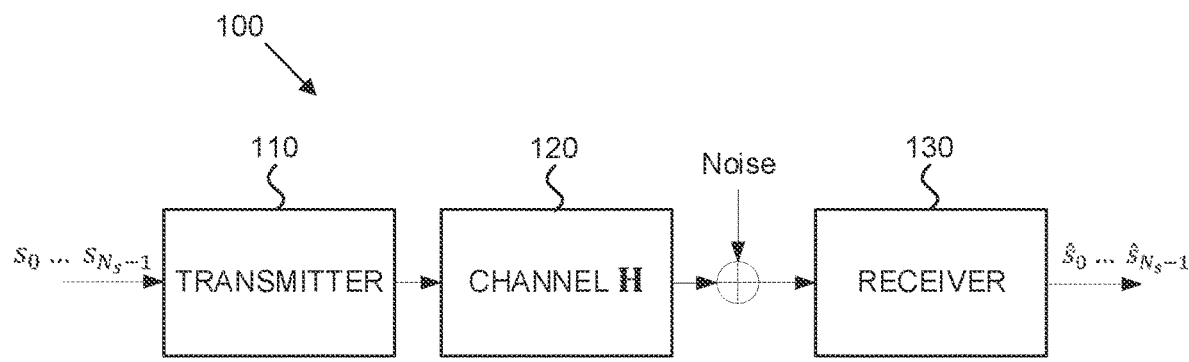
FIG. 1 illustrates an example of a communication system, according to an embodiment of the present disclosure.

FIG. 1 illustrates an example of a communication system 100, according to an embodiment of the present disclosure. The communication system 100 may comprise a transmitter 110, a transmission channel 120, and a receiver 130. The transmitter 110 generates a transmitted signal based on data symbols $s_0$ to $s_{N_s-1}$, where $N_s$ is the number of data symbols that carry payload data. In addition, there may be guard data symbols, for example guard band symbols, which may be assigned to zero. The transmitter 110 may generate a signal based a transmit transform and a projection to a set of sequences. An input symbol sequence to the projection may comprise an output of the transmit transform.

The transmitted signal may be fed through the transmission channel 120, which may be modelled by a channel matrix H. Noise may be modelled by additive white Gaussian noise added after the transmission channel 120. Receiver 130 may determine estimates of the input symbols $\hat{s}_0$ to $\hat{s}_{N_s-1}$ based on performing symbol detection on the received signal.

Spectrally well-contained signals may be obtained based on discrete prolate spheroidal sequences (DPSS). DPSSs may be associated with a length, N, and a bandwidth, W. (N,W)-DPSSs may be obtained as eigenvectors of a prolate matrix $B_{N,W}$ whose elements (m, n) are $$[B_{N,W}]_{m,n} = \frac{\sin 2\pi W(m-n)}{\pi(m-n)}, (m,n) \in \{1, \ldots, N\}^2, W \in (0, 1/2).$$

Hence, both m and n may range from 1 to N. Notation (0,½) may denote an open range from 0 to ½, and hence the (normalized) bandwidth W may be between 0 and ½ (0<W<½).

si is defined as the l-th eigenvector of $B_{N,W}$ and $\lambda_{N,W}^{(l)}$ as the associated eigenvalue (indexed such that $\Delta W$ are decreasing with l). Further, $S_{N,W}$ is defined as the N×N orthogonal matrix whose l-th column is $s_{N,W}^{(l)}$. For some $\epsilon \in (0, 1/2)$, $S_{N,W}^{1-\epsilon,\epsilon}$ is defined as the matrix comprising sequences $s_{N,W}^{(l)}$ satisfying $\epsilon \leq \lambda_{N,W}^{(l)} \leq 1-\epsilon$. Again, (0,½) may denote an open range from 0 to ½, and hence the value of parameter E may be between 0 and ½ (0<ϵ<½). Similarly, $S_{N,W}^{1,1-\epsilon}$ is defined as comprising sequences $s_{N,W}^{(l)}$ satisfying $1-\epsilon < \lambda_{N,W}^{(l)}$ and $S_{N,W}^{\epsilon,0}$ as comprising sequences $s_{N,W}^{(l)}$ satisfying $\lambda_{N,W}^{(l)} < \epsilon$. Matrix $S_{N,W}$ may then be expressed by $S_{N,W} = [S_{N,W}^{1,1-\epsilon} \; S_{N,W}^{1-\epsilon,\epsilon} \; S_{N,W}^{\epsilon,0}]$. Eigenvectors of the prolate matrix $B_{N,W}$ may be also called the Slepian basis.

It is noted that sequences $s_{N,W}^{(l)}$ with $\lambda_{N,W}^{(l)}$ close to one have most of their energy within the intended band (−W,W) in the discrete-time Fourier transform (DTFT) domain. Columns of $S_{N,W}^{1,1-\epsilon}$ have out-of-band emission (OOBE) (or spectral leakage) power levels that are of the order of $\epsilon$. Thus, an orthogonal projection of a signal vector on the span of the columns of $S_{N,W}^{1-\epsilon}$ may be used to reduce to E the OOBE level of that signal vector.

Moreover, a vector (sequence) of consecutive N samples truncated from a band-limited infinite-length discrete-time signal with bandwidth (−W,W) in the DTFT domain may be approximated up to a small normalized mean squared error (MSE) error of the order of E by using its orthogonal projection on the range of $[S_{N,W}^{1,1-\epsilon} \; S_{N,W}^{1-\epsilon,\epsilon}]$. Computing the orthogonal projection of such signal vectors on the span of the columns of $S_{N,W}^{1,1-\epsilon}$ may be therefore approximated by subtracting from the vector its projection on the span of the columns of the matrix $S_{N,W}^{1-\epsilon,\epsilon}$. The latter projection may be computed with reduced complexity since in many applications $S_{N,W}^{1-\epsilon,\epsilon}$ has fewer columns than $S_{N,W}^{1,1-\epsilon}$.

The embodiments of the present disclosure therefore provide a method for processing multi-carrier communications signals to make them spectrally well contained. In contrast to mere windowing or filtering e.g., filtered-OFDM, the embodiments of the present disclosure are based on orthogonally projecting segments from the multi-carrier signal on the span of a subset of the Slepian basis. Also, methods to efficiently approximate this orthogonal projection operation are disclosed to reduce its computational complexity. Each data symbol from the signal that is fed to the orthogonal projection module (or to the module that approximates it) may thus be carried by the vectors of the used subset of the Slepian basis. For example, due to the disclosed projection operation, each data symbol may be carried by a linear combination of the Slepian vectors (discrete prolate spherical sequences) involved in the projection. Furthermore, additional features, such as for example zero tails appended to the signal segments that are fed to the projection modules or null symbols inserted among the data symbols, the resulting linear combination of the involved Slepian vectors may inherit useful properties of the input multi-carrier signal, that is, the projected signal is close to a multi-carrier waveform, while at the same time the projection improves the spectral containment compared to the input multi-carrier signal. Therefore, embodiments of the present disclosure enable generation and reception of signals projected to a subset of the Slepian basis with low complexity. Furthermore, methods to reduce adverse effects of such projection are disclosed.

Figure 2:
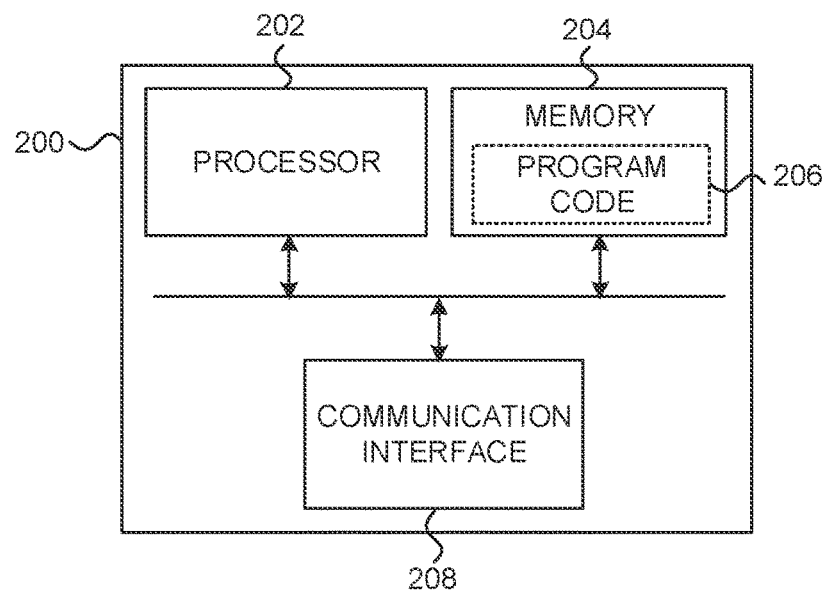
FIG. 2 illustrates an example of a device configured to practice one or more embodiments of the present disclosure.

FIG. 2 illustrates an example of a device 200 configured to practice one or more embodiments. Device 200 may be, for example, configured to generate a projected signal or receive a projected signal. Device 200 may comprise at least one processor 202. The at least one processor 202 may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The device 200 may further comprise at least one memory 204. The memory 204 may be configured to store, for example, computer program code or the like, for example operating system software and application software. The memory 204 may comprise one or more volatile memory devices, one or more non-volatile memory devices, and/or a combination thereof. For example, the memory may be embodied as magnetic storage devices (such as hard disk drives, magnetic tapes, etc.), optical magnetic storage devices, or semiconductor memories (such as mask ROM, PROM (programmable ROM), EPROM (erasable PROM), flash ROM, RAM (random access memory), etc.).

Device 200 may further comprise communication interface 208 configured to enable the device 200 to transmit and/or receive information. The communication interface 208 may comprise an internal communication interface such as for example an interface between baseband circuitry and radio frequency (RF) circuitry of a transmitter, receiver, or a transceiver device. Alternatively, or additionally, the communication interface 208 may be configured to provide at least one external wireless radio connection, such as for example a 3GPP mobile broadband connection (e.g. 3G, 4G, 5G, or future generations); a wireless local area network (WLAN) connection such as for example standardized by IEEE 802.11 series or Wi-Fi alliance; a short range wireless network connection such as for example a Bluetooth connection. The communication interface 208 may hence comprise one or more antennas to enable transmission and/or reception of radio frequency signals over the air.

The device 200 may further comprise other components and/or functions such as for example a user interface (not shown) comprising at least one input device and/or at least one output device. The input device may take various forms such a keyboard, a touch screen, or one or more embedded control buttons. The output device may for example comprise a display, a speaker, a vibration motor, or the like.

When the device 200 is configured to implement some functionality, some component and/or components of the device, such as for example the at least one processor 202 and/or the at least one memory 204, may be configured to implement this functionality. Furthermore, when the at least one processor 202 is configured to implement some functionality, this functionality may be implemented using program code 206 comprised, for example, in the at least one memory 204.

The functionality described herein may be performed, at least in part, by one or more computer program product components such as software components. According to an embodiment, the device 200 comprises a processor or processor circuitry, such as for example a microcontroller, configured by the program code 206, when executed, to execute the embodiments of the operations and functionality described herein. Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), graphics processing units (GPUs), or the like.

The device 200 may be configured to perform method(s) described herein or comprise means for performing method(s) described herein. In one example, the means comprises the at least one processor 202, the at least one memory 204 including program code 206 configured to, when executed by the at least one processor 202, cause the device 200 to perform the method(s).

The device 200 may comprise, for example, a computing device such as for example a modulator chip, a demodulator chip, a baseband chip, a mobile phone, a tablet, a laptop, an internet-of-things device, a base station, or the like. Although the device 200 is illustrated as a single device, it is appreciated that, wherever applicable, functions of the device 200 may be distributed to a plurality of devices, for example between components of a transmitter, a receiver, or a transceiver.

Figure 3:
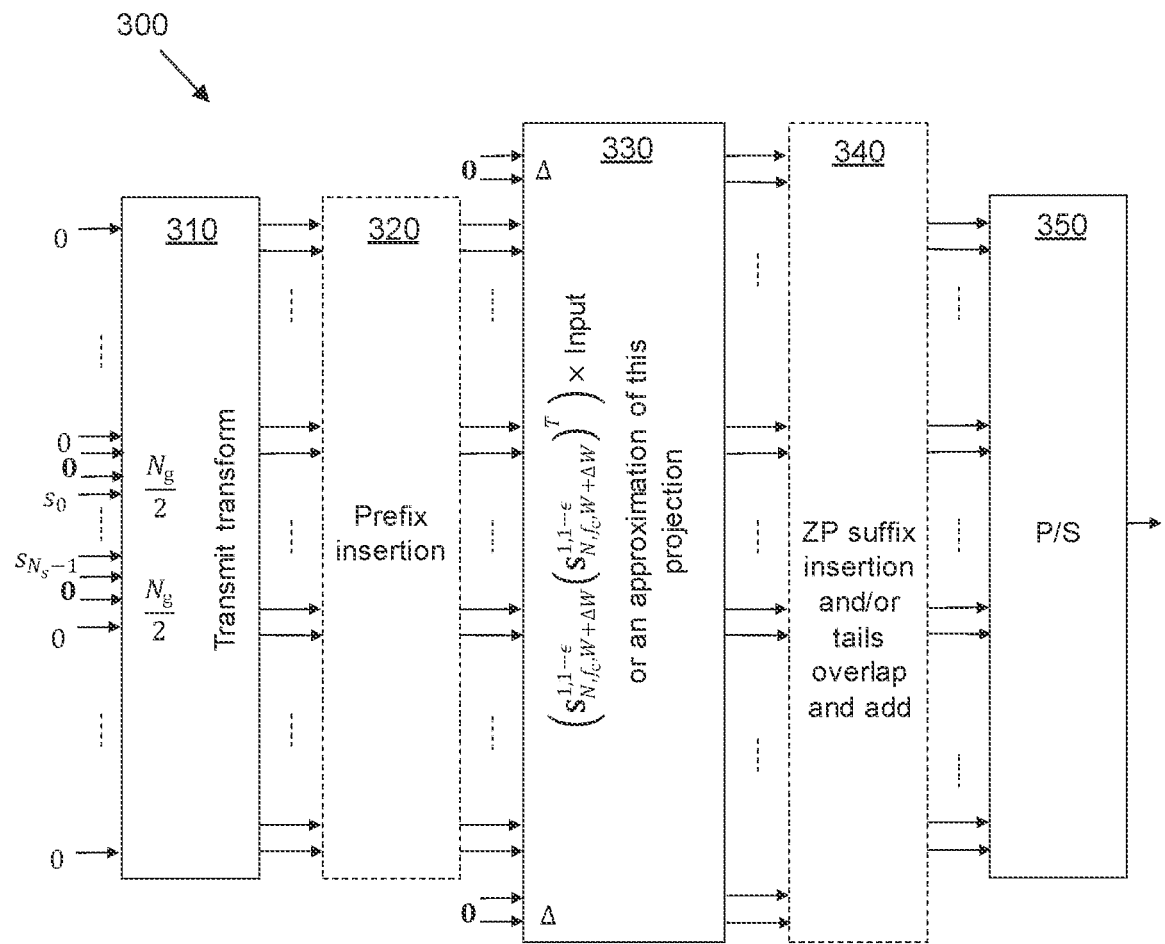
FIG. 3 illustrates an example of a device for generating a signal based on a projection of input symbols, according to an embodiment of the present disclosure.

FIG. 3 illustrates an example of a device for generating a signal based on projection of input symbols, according to an embodiment of the present disclosure. The device 300 may be included at the transmitter 110, for example as a modulator within baseband circuitry of the transmitter 110. It is however noted that not all of the illustrated functions or modules may be included in practical implementations. FIG. 3 illustrates an example of a general block diagram of the device 300. Further embodiments of the device 300 are provided in FIGS. 6, 8, 10, 12, and 14.

As discussed above, spectrally well-contained signals may be obtained based on discrete prolate spheroidal sequences (DPSS). The device 300 may therefore comprise a projection module 330 for projecting input signal to a subset of the DPSSs. The projection module 330 may take as an input a sequence of input symbols. The input symbols may comprise complex-valued symbols. The sequence of input symbols may be obtained by any suitable means, for example based on applying a transmit transform 310 to a sequence of data symbols, optionally followed by prefix insertion 320. The transmit transform 310 may comprise an N-point transmit transform such as for example an inverse fast Fourier (IFFT) transform or an inverse discrete affine Fourier (IDAFT) transform. A multi-carrier OFDM signal may be, for example, obtained by setting the transmit transform 310 to be an IFFT module. A single-tone signal may be obtained from the same block diagram of OFDM when only one data symbol at the input to the IFFT module is non-zero. A multi-chirp signal may be obtained by setting the transmit transform 310 to be an IDAFT module.

The device 300 may obtain a first set of sequences to which the sequence of input symbols may be projected at projection module 330. A first projected symbol sequence may be obtained as an output of the projection module 330. The set of sequences may be preconfigured at the device 300 or determined at the time of generation of the signal, for example based on signalling information received from another device, such as for example receiver 130. The device 300 may then generate the signal based on the first projected sequence, for example based on parallel-to-serial (P/S) conversion 350 optionally preceded by zero-padding (ZP) suffix insertion and/or tails overlap-and-add module 340.

Consider a sequence (vector) x comprising N>1 time-domain samples of one symbol of a multi-carrier, multi-chirp or single-tone communications signal, possibly including samples of a cyclic prefix (CP) or other types of prefixes and of zero padding. This signal may be intended to occupy the frequency band (−W,W) to carry payload data by a sequence s of $N_s$ data symbols. Define $N_{trans} \geq N_s$ ('trans' for 'transform', the size of the linear transform used to generate the signal) as the total number of data symbols that can be carried by the signal. For example, trans=FFT in embodiments with multi-carrier signals generated using the inverse Fourier transform (IFFT). Now, let $A_s$ be the $N_{trans} \times N_s$ matrix given by $A_s \overset{def}{=} [0 \ I_{N_s} \ 0]T$ that defines the position of data symbols s in the whole multi-carrier or multi-chirp symbol, where $I_{N_s}$ is an identity matrix of size $N_s \times N_s$. In OFDM multi-carrier systems with no cyclic prefix and no zero padding, $N=N_{FFT}$ and $x=F_N^H A_s s$, where $F_N$ is the N-point discrete Fourier transform (DFT) matrix. In discrete affine Fourier transform (DAFT) based multi-chirp systems with no prefixes and no zero padding, $N=N_{DAFT}$ and $x=\omega_N^H A_s s$ where $\Phi_N$ is the N-point DAFT matrix.

Limiting the spectral leakage of sequence x can be achieved for example by projecting the sequence x on the first set of sequences corresponding to the span of the columns of $S_{N,W}^{1,1-\epsilon}$ to determine the first projected symbol sequence $S_{N,W}^{1,1-\epsilon}(S_{N,W}^{1,1-\epsilon})^T x$ for some $\epsilon \in (0, \frac{1}{2})$. The first set of sequences may therefore comprise or be based on discrete prolate spheroidal sequences associated with eigenvalues having a value larger than a first threshold, for example 1−ϵ. The OOBE of the columns of $S_{N,W}^{1,1-\epsilon}$ (and hence of signal $S_{N,W}^{1,1-\epsilon}(S_{N,W}^{1,1-\epsilon})^T x$) have a power of the order of ϵ. The projected sequence $S_{N,W}^{1,1-\epsilon}(S_{N,W}^{1,1-\epsilon})^T x$ may therefore have very good spectral containment, if the parameter ϵ is chosen to be small enough. Since matrix $S_{N,W}^{1,1-\epsilon}$ has approximately [2NW] columns, the proposed projection procedure has a N[2NW]≈$N^2$ computational complexity.

According to an embodiment, the above projection, resulting in the first projected symbol sequence, may be approximated by projecting the sequence of input symbols to a second set of sequences and subtracting the resulting second projected sequence from the sequence of input symbols. The approximation of the above orthogonal projection, resulting in lower complexity, is based on the following observations:

$$S_{N,W}^{1-\epsilon,\epsilon} \text{ has approximately } \log\frac{1}{\epsilon} \log N \text{ columns.}$$

A sequence of consecutive N samples truncated from a band-limited infinite-length discrete-time signal with bandwidth (−W,W) in the discrete-time Fourier transform (DTFT) domain can be approximated up to a small normalized mean squared error (MSE) error of the order of E using its orthogonal projection on $[S_{N,W}^{1,1-\epsilon} \ S_{N,W}^{1-\epsilon,\epsilon}]$.

The second set of sequences may be therefore obtained by selecting DPSSs associated with eigenvalues between the first threshold and a second threshold. The first threshold may be 1−ϵ and the second threshold may be Σ, where $\epsilon \in (0, \frac{1}{2})$. Since the sequence x of the N samples corresponding to one symbol of a multi-carrier, multi-chirp or single-tone communication signal may be considered as N consecutive samples from a band-limited infinite-length discrete-time signal with bandwidth (−W,W) in the DTFT domain, the above two properties apply to sequence x which means that it is possible to approximate the first projected symbol sequence $S_{N,W}^{1-\epsilon,\epsilon}(S_{N,W}^{1-\epsilon,\epsilon})^T x$ up to an ϵ MSE error by computing $x - S_{N,W}^{1-\epsilon,\epsilon}(S_{N,W}^{1-\epsilon,\epsilon})^T x$. Since $S_{N,W}^{1-\epsilon,\epsilon}$ has approximately $$\log\frac{1}{\epsilon} \log N$$

columns, computing the first projected symbol sequence by $x - S_{N,W}^{1-\epsilon,\epsilon}(S_{N,W}^{1-\epsilon,\epsilon})^T x$ can be performed with $$\log \frac{1}{\epsilon} N$$

log N computational complexity, which is much smaller than $N^2$ for values of N and $\epsilon$ that may be of practical interest.

According to an embodiment, the first set of sequences or the second set of sequences may comprise frequency shifted DPSSs. The above analysis is based on assuming a signal occupying the band (−W,W), i.e. a band centered on the zero frequency. However, the methods may be applied also to signals of bandwidth $2W \in (0,1)$ centered on any (normalized) frequency $f_c \in (0,1)$. For such signals, the above projection, or its approximation may be applied using modulated (frequency shifted) DPSSs $S_{N,f_c,W}^{1,1-\epsilon} \triangleq (e_{f_c} \otimes 1_{N_{1,1-\epsilon}}^T) \odot S_{N,W}^{1,1-\epsilon}$ and $S_{N,f_c,W}^{1-\epsilon,\epsilon} \triangleq (e_{f_c} \otimes 1_{N_{1-\epsilon,\epsilon}}^T) \odot S_{N,W}^{1-\epsilon,\epsilon}$, where $N_{1,1-\epsilon}$ is the number of columns of $S_{N,W}^{1,1-\epsilon}$, $N_{1-\epsilon,\epsilon}$ is the number of columns of $S_{N,W}^{1,1-\epsilon}$, ⊙ (stands for the Hadamard (element-wise) product and ⊗ for the Kronecker product, and $e_{f_c}$ is a length-N vector of samples from a discrete-time complex exponential signal with digital frequency $f_c$. In general, the first and/or second sets of sequences may comprise sequences that are derived from subset(s) of DPSSs, for example by frequency shifting as described above.

As discussed above, the DPSSs may comprise eigenvectors of the prolate matrix $B_{N,W}$, where elements (m, n) of the prolate matrix $[B_{N,W}]_{m,n}$ comprise $$[B_{N,W}]_{m,n} = \frac{\sin 2\pi W(m-n)}{\pi(m-n)},$$

where the indices $(m, n) \in \{1, \ldots, N\}^2$ (both m and n ranging from 1 to N), where N is the length of the sequence of input symbols, and $W \in (0, \frac{1}{2})$ is the intended bandwidth of the signal. However, the disclosed projection or approximation, while producing a signal with very low OOBE levels, causes the end-to-end input-output relation experienced by the data symbols carried by the processed multi-carrier, multi-chirp, or single-tone communications signal to be modified. This modification can be controlled by using one or more of the following additional parameters: a number $N_g \geq 0$ of null (guard) data symbols inserted at edges of the sequence of data symbols before the transmit transform 310, a bandwidth excess $\Delta W \geq 0$ applied in the projection module 330, and a number of the time-domain tail symbols $\Delta \geq 0$ inserted at edges of the sequence of input symbols at the input of the projection module 330.

According to an embodiment, the bandwidth of the first set of sequences may comprise a bandwidth excess $\Delta W \geq 0$ with respect to the intended bandwidth W of the signal. In this embodiment, the DPSSs may comprise eigenvectors of a prolate matrix $B_{N,W+\Delta W}$, where elements (m, n) of the prolate matrix $[B_{N,W+\Delta W}]_{m,n}$ comprise $$[B_{N,W+\Delta W}]_{m,n} = \frac{\sin 2\pi(W+\Delta W)(m-n)}{\pi(m-n)}.$$

The signal bandwidth may be therefore assumed to be equal to $2(W+\Delta W)$ instead of 2 W. This enables to reserve some band for the modifications caused by the projection, which may primarily affect the edges of the signal band, for example subcarriers at the edges of the signal band in multicarrier transmission. Using a non-zero value for $\Delta W$ thus limits the effect of the projection operation to the edges of the signal band. The OOBE levels may slightly increase in the parts of the spectrum corresponding to the frequency excess $\Delta W$, but the spectral concentration of the resulting signal may be still improved compared to non-projected signals. With the frequency shifted DPSSs and the bandwidth excess parameter $\Delta W$, the matrices used in the disclosed projection operations may be denoted by $S_{N,f_c,W+\Delta W}^{1,1-\epsilon}$ or $S_{N,f_c,W+\Delta W}^{1-\epsilon,\epsilon}$. It is however noted that $f_c$ and/or $\Delta W$ may be set to zero in some embodiments.

According to an embodiment, the sequence of data symbols may comprise guard data symbols at edges of the sequence of data symbols. Therefore, in addition to the data symbols $s_0$ to $s_{N_s-1}$ carrying payload data, $N_g/2$ guard data symbols may be inserted at each edge of the sequence of data symbols $s_0$ to $s_{N_s-1}$ at the input of the transmit transform 310. Values of the $N_g$ guard data symbols may be set to zero (nulled). Setting $N_g > 0$ may therefore comprise nulling (not using) some data symbols out of the total $N_{trans}$ symbols at the transmitter side. Corresponding symbols may be discarded at the receiver side. In multi-carrier embodiments, the nulled symbols may be chosen to occupy the edge sub-carriers, i.e., the sub-carriers most affected by the projection operation, such that the remaining non-nulled data symbols will experience no or very little change in their end-to-end signal model when received at the receiver 130. In combination with $\Delta W \geq 0$, this embodiment enables to further limit the effects of the projection operation.

According to an embodiment, the device 300 may insert tail symbols at edges of the sequence of input symbols. The tail symbols may comprise zero-valued symbols. The tail symbols may be inserted at the input of the projection module 330. The number of tail symbols at each side of the sequence of input symbols may be denoted by $\Delta$. Therefore, the number of tail symbols may be equal to $2\Delta$. Instead of an overlap-and-add operation, a zero-padding suffix may be inserted at module 340, as will be further described below.

Figure 4:
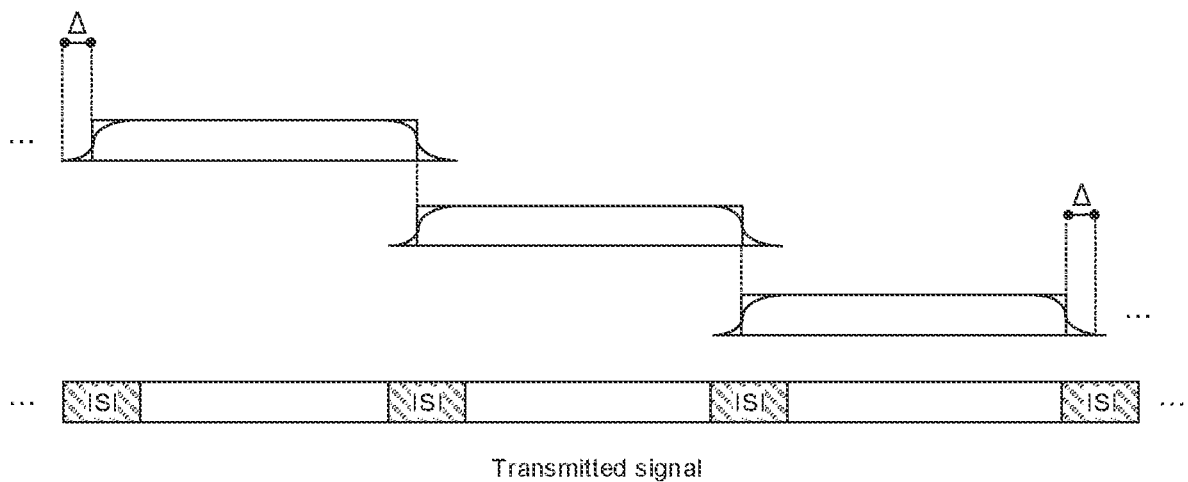
FIG. 4 illustrates an example of overlapping and adding projection tails, according to an embodiment of the present disclosure.

FIG. 4 illustrates an example of overlapping and adding projection tails, according to an embodiment of the present disclosure. When padding the input symbols sequence of the projection module 330 in the time-domain with $\Delta$-long tails on each side, the output symbol block of the projection, comprising a projected symbol sequence, may be overlapped and added at module 340 with previous and subsequent output symbol blocks comprising previous and subsequent projected symbol sequences, respectively. Overlapping and adding may comprise overlapping the $\Delta$-long tail with $\Delta$ non-tail samples at the edge of the neighboring symbol block. Applying a non-zero tail length $\Delta$ enables to limit the effect of the projection operation to the samples at the edge of the signal interval. However, this will create a post-projection signal segment with non-zero tails that overlap with previous and subsequent symbol blocks, thus causing some level of inter-symbol interference (ISI). However, in practice the ISI level is small enough not to cause any significant degradation in data detection performance.

Referring back to FIG. 3, the device 300 may transmit to the receiver 130 information about transmission parameters. The device 300 may for example transmit at least one of an indication of the bandwidth excess $\Delta W$, an indication of a number of the guard data symbols $N_g$ (or $N_g/2$), and an indication of a number of the zero-valued tail symbols $\Delta$ (or $2\Delta$). This enables the receiver 130 to decode the signal with dynamically variable transmission parameter(s). The device 300 may further receive an indication of a length $N_w$ ('w' for 'window') of a receive processing window from the receiver 130. One or more of the above parameters ($\Delta W$, $N_g$, $\Delta$) may be determined based on the length of the receive processing window. The receiver 130 may choose $N_w$, for example based on its complexity or latency constraints, and signal the chosen $N_w$ to the transmitter 110. The transmitter 110 may determine the value of A such that it satisfies $N+2\Delta \leq N_w$. For example, the transmitter may select $\Delta=(N_w-N)/2$. If the resulting value of $\Delta$ is large enough to avoid distortion due to the projection step, the transmitter may set $N_g=0$ and $\Delta W=0$. If the resulting value of $\Delta$ is not large enough, $N_g$ and/or $\Delta W$ may be increased beyond zero to mitigate the distortion while not exceeding certain predefined upper bound, for example $N_g=[0.1N]$ and $\Delta W=0.1$ W. Hence, transmitter 110 may select $N_g>0$ and/or $\Delta W \geq 0$, in response to determining that residual projection distortion exists for the selected value of $\Delta$. Values of $N_g$ and/or $\Delta W$ may be upper bounded by predefined value(s).

The device 300 may be further configured to output the generated signal, for example to further processing stages of the transmitter 110, or to transmit the generated signal to the receiver 130 over an air interface by means of at least one antenna. Device 300 enables to generate spectrally well-contained projected signals and therefore to reduce out-of-band emissions. Device 300 also enables to mitigate distortion caused by the projection by the bandwidth excess, the guard data symbols, and/or the tail symbols. The prefix enables low-complex equalization in case of a time-dispersive channel.

Figure 5:
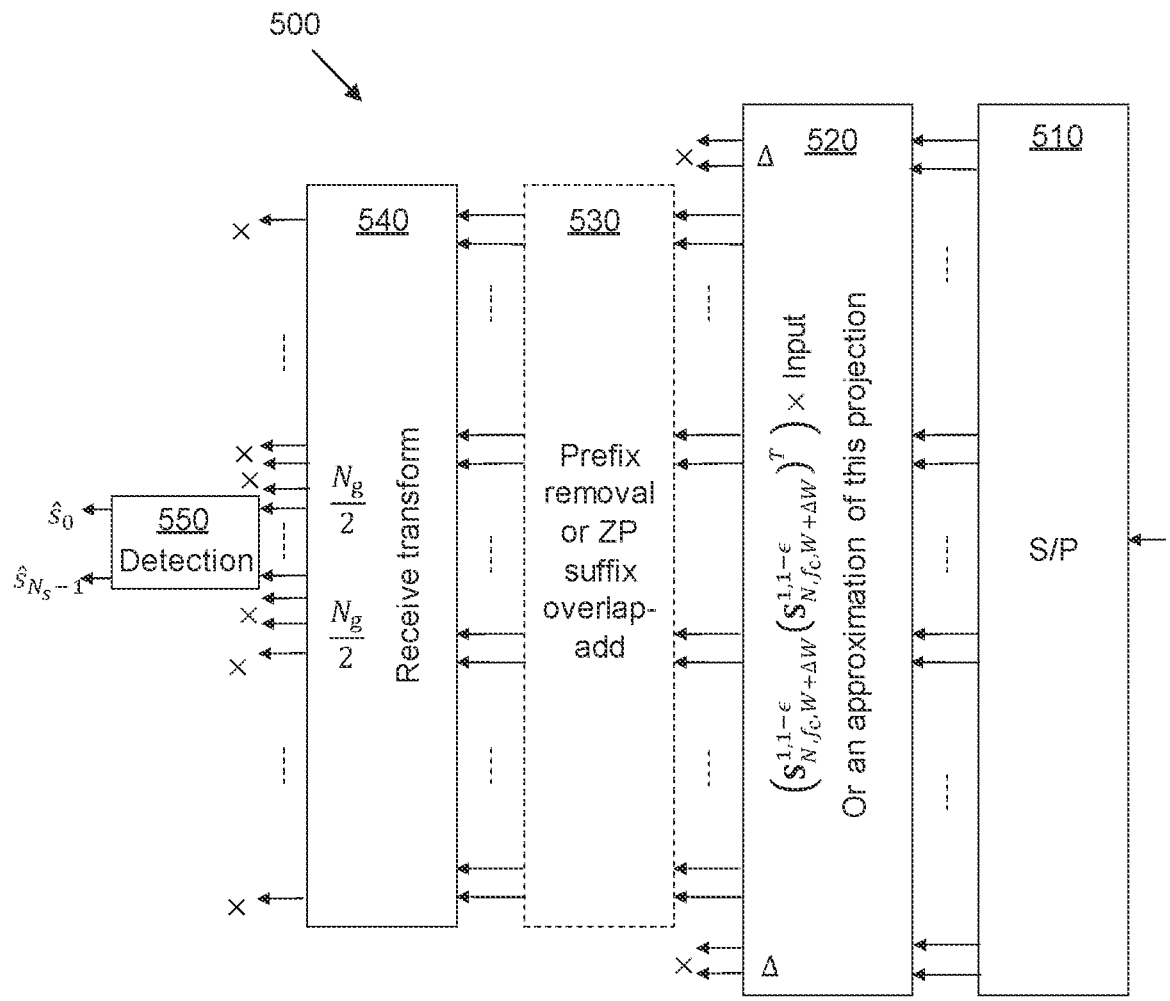
FIG. 5 illustrates an example of a device for receiving a projected signal, according to an embodiment of the present disclosure.

FIG. 5 illustrates an example of a device for receiving a projected signal, according to an embodiment of the present disclosure. The device 500 may be included at the receiver 130, for example as a demodulator within baseband circuitry of the receiver 130. It is however noted that not all of the illustrated functions or modules may be included in practical implementations. The device 500 may receive the signal generated by device 300, for example over an air interface by means of at least one antenna, or from previous processing stages of the receiver 130. FIG. 5 illustrates an example of a general block diagram of the device 500. Further embodiments of the device 500 are provided in FIGS. 7, 9, 11, 13, and 15.

The device 500 may comprise a serial-to-parallel (S/P) conversion 510, an out-of-band (OOB) interference attenuation module 520, a prefix removal or suffix overlap-add module 530, a receive transform 540, and/or a detection module 550. The serial-to-parallel conversion 510 may operate on blocks of $N_w$ samples of the received signal, corresponding to the receive processing window of length $N_w \geq N$ samples, which may be centred sequentially on the time-domain samples of each (multi-carrier, multi-chirp, or single-tone) symbol to get the $N_w$-long vector y of received samples. Alternatively, the OOB interference attenuation module 520 may define the window of received symbols.

The OOB interference attenuation module 520 may project the window of received symbols to the first set of sequences to obtain a first symbol sequence as an output of the OOB interference attenuation model 520. As discussed above, the first set of sequences may be based on DPSSs associated with eigenvalues having a value larger than the first threshold. The projection may be computed based on $S_{N_w,f_c,W}^{1,1-\epsilon}(S_{N_w,f_c,W+\Delta W}^{1,1-\epsilon})^T y$, or an approximation of this linear projection, for example by $y-S_{N_w,f_c,W}^{1-\epsilon,1}(S_{N_w,f_c,W+\Delta W}^{1-\epsilon,\epsilon})^T y$, that is, based on subtracting a second projected sequence of the window of received symbols from the window of received symbols. Determining the second projected sequence may comprise a projection of the window of received symbols to a second set of sequences that is based on DPSSs associated with eigenvalues between the first threshold and the second threshold. Alternatively, the OOB interference attenuation module 520 may filter the window of received symbols. For example, OOB interference attenuation may be achieved by an approximation of the effect of the above projection by computing the $N_w$-point FFT of y, setting to zero the $N_w$-point DFT frequency domain samples corresponding to the sub-bands of the interfering signals and to the position of the $N_g$ null guard sub-carriers (in embodiments with a multi-carrier transmission and with $N_g>0$), and applying $N_w$-point IFFT to the resulting samples. Other approximations of the effect of the above projection may be applied as well, for example by performing a filtering operation to the received signal using any suitable filter with a passband covering the interval $(f_c-W, f_c+W)$ in normalized frequencies.

Since the above operations are linear, the input-output relation may be written as $$y_d = A_{Rx} H A_{Tx} s + w.$$

Here, $y_d$ ('d' for 'detection') is the vector of noisy samples at the output of the OOB interference attenuation module 520 to be used for data detection (cf. the first symbol sequence). In embodiments with $\Delta=0$, the term w may represent additive thermal noise. In embodiments with $\Delta>0$. The term w may represent both additive thermal noise and residual inter-symbol interference due to the overlapping $\Delta$-long symbol tails. Matrix H is the channel matrix, while $A_{Tx}$ and $A_{Rx}$ are the matrices representing respectively the effect of the transmitter-side projection and the receiver-side projection on the input-output relation.

For example, in multi-carrier embodiments with $\Delta=0$, $N_g=0$, $N_w=N=N_{FFT}$, matrix H is the N×N frequency-domain channel matrix. If exact projection operations are used, then $$A_{Tx} = (F_N S_{N,f_c,W+\Delta W}^{1,1-\epsilon} (S_{N,f_c,W+\Delta W}^{1,1-\epsilon})^H F_N^H) A_s,$$

$$A_{Rx} = A_s^T (F_N S_{N,f_c,W+\Delta W}^{1,1-\epsilon} (S_{N,f_c,W+\Delta W}^{1,1-\epsilon})^H F_N^H).$$

Otherwise, if the disclosed lower-complexity approximate projection operations are used at both the transmitter 110 and the receiver 130, then $$A_{Tx} = (F_N S_{N,f_c,W+\Delta W}^{1-\epsilon,\epsilon} (S_{N,f_c,W+\Delta W}^{1-\epsilon,\epsilon})^H F_N^H) A_s,$$

$$A_{Rx} = A_s^T (F_N S_{N,f_c,W+\Delta W}^{1-\epsilon,\epsilon} (S_{N,f_c,W+\Delta W}^{1-\epsilon,\epsilon})^H F_N^H).$$

Here, $F_N$ is the N-point discrete Fourier transform (DFT) matrix and $A_s$ is a N×$N_s$ matrix given by $A_s \overset{\text{def}}{=} [0 \ I_{N_s} \ 0]T$ where $N_s$ is the length of vector s and where 0 is an all-zero sub-matrix.

The prefix removal or ZP suffix overlap-add module 530 may take as input the first symbol sequence, for example the projected or filtered sequence of symbols output by the OOB interference attenuation module 520. Symbols corresponding to zero-valued tail symbols of the sequence of input symbols (which was subject to projection at the transmitter 110) at edges of the first symbol sequence may be removed or discarded at the output of the OOB interference attenuation module 520. The ZP suffix may be eliminated based on an overlap-add (OLA) algorithm. The OLA algorithm may comprise adding samples received at positions of the ZP suffix to samples received at positions of a number of data samples equal to the number of suffix samples that are located at the opposite edge input of the module 530. Alternatively, module 530 may remove symbols corresponding to a cyclic prefix or a chirp periodic prefix of the sequence of input symbols.

The receive transform 540 may comprise applying an N-point receive transform to the first symbol sequence ($y_d$)

which may have been processed by the prefix removal or ZP suffix overlap-add module 530. The receive transform 540 may for example comprise a fast Fourier transform (FFT) or a discrete affine Fourier transform (DAFT). The receive transform 540 enables to receive signals generated based on a transmit transform and projection, such as for example projected multi-carrier or multi-chirp signals.

At the detection module 540, detection of the received signal may be performed based on the transformed symbol sequence obtained as output of the receive transform 540. Depending on complexity constraints and on the choice of the involved parameters, the detection module 550 may be either a simple equalizer where detection is only based on the channel matrix H, for example one-tap equalization based on the entries of the main diagonal of H in multi-carrier embodiments. Alternatively, the detection module 550 may take the values of matrices $A_{Tx}$ and $A_{Rx}$ into account by using a detection method based on the effective channel matrix $H_{eff} \stackrel{def}{=} A_{Rx} H A_{Tx}$, e.g., zero forcing (ZF) $\hat{s}_{ZF} = (H_{eff}^H H_{eff})^{-1} H_{eff}^H y_d$ detection or minimum mean squared error (MMSE) $\hat{s}_{MMSE} = (H_{eff}^H H_{eff} + \sigma^2 I)^{-1} H_{eff}^H y_d$ detection (for some noise-to-signal ratio value $\sigma^2$). The detection module 540 may provide as output the estimates of the transmitted data symbols carrying payload, $\hat{s}_0 \ldots \hat{s}_{N_s-1}$.

The device 500 may transmit an indication of the length $N_w$ of the window of received symbols configured at the device 500 (the receive processing window) to the transmitter 110. Based on this information the transmitter 110 may determine one or more of the parameters $\Delta W$, $N_g$, or $\Delta$. The device 500 may receive transmission parameter information, for example at least one of: an indication of the bandwidth excess $\Delta W$, an indication of a number of the guard data symbols $N_g$ (or $N_g/2$), and an indication of a number of the zero-valued tail symbols $\Delta$ (or $2\Delta$). Based on the received transmission parameter information, the device 500 may configure the OOB interference attenuation module 520 or remove symbols corresponding to the tail or guard band symbols. This enables the receiver 130 to decode the received signal with dynamically variable transmission parameter(s). Device 500 enables to receive spectrally well-contained projected signals and to mitigate effects of the projection by means of the bandwidth excess, the guard band samples, and/or the tail symbols.

Figure 6:
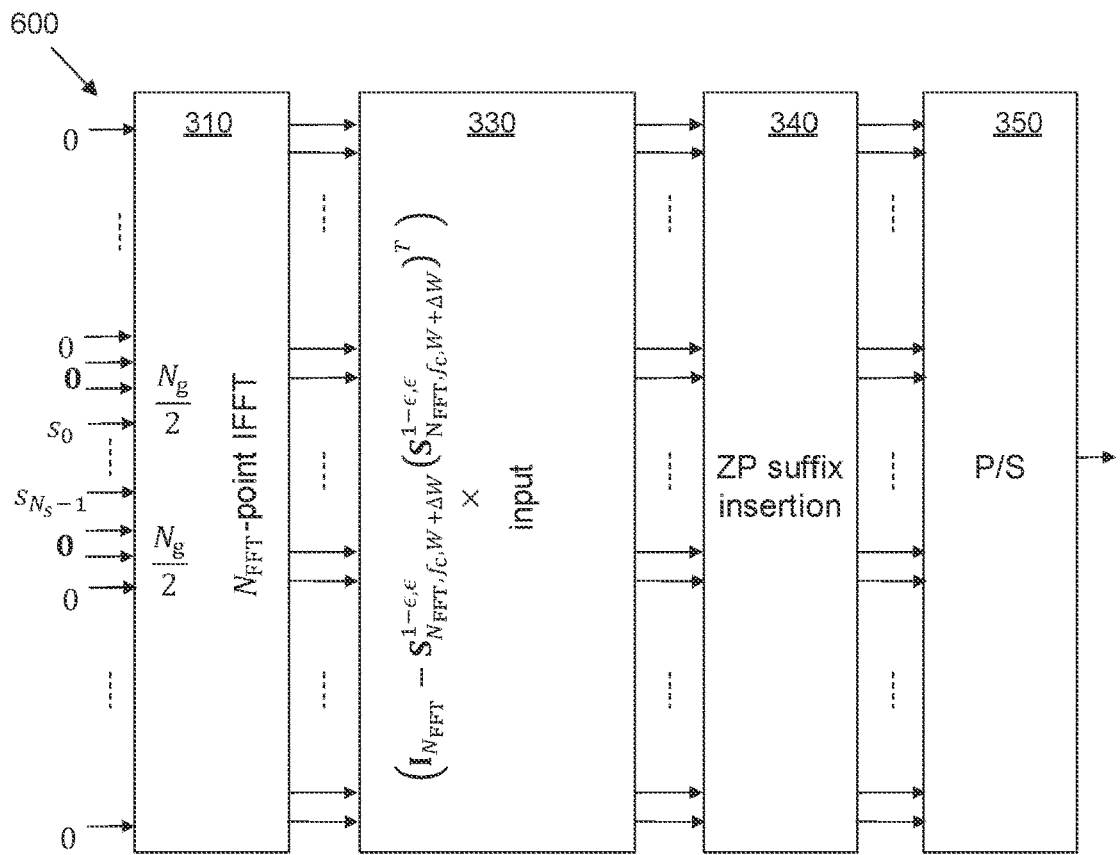
FIG. 6 illustrates an example of a device for generating a signal based on a projection of a multi-carrier signal, according to an embodiment of the present disclosure.

FIG. 6 illustrates an example of a device for generating a signal based on projection of a multi-carrier signal, according to an embodiment of the present disclosure. In this embodiment, $\Delta = 0$, $\Delta W \geq 0$ and $N_g > 0$. The transmit transform module 310 of device 600 may comprise an $N_{FFT}$-point IFFT block. The value of N used when applying the transmit projection operations may be therefore $N = N_{FFT}$. The projection may be done for example using the lower-complexity operation $x - S_{N_{FFT},f_c,W+\Delta W}^{1-\epsilon,\epsilon} (S_{N_{FFT},f_c,W+\Delta W}^{1-\epsilon,\epsilon})^T x$, where x comprises the input symbol sequence to the projection module 330. As illustrated in the figure, the projection may be alternatively represented by $$(I_{N_{FFT}} - S_{N_{FFT},f_c,W+\Delta W}^{1-\epsilon,\epsilon}(S_{N_{FFT},f_c,W+\Delta W}^{1-\epsilon,\epsilon})^T) \times \text{Input},$$

where Input comprises the input symbol sequence to the projection module 330, in this example the output of the IFFT. It is however noted that any projection operation described with reference to any embodiment of the present disclosure may be performed either by the exact projection to the relevant subset of DPSS-based sequences or any suitable approximation of it.

The resulting $N_{FFT}$ samples from each projection operation, corresponding to different sequences of input symbols, may be optionally zero padded at module 340 before transmission. For example, each projected symbol sequence obtained as output of the projection module 330 may be followed by a number $N_{ZP}$ of zero/null samples. This enables the receiving terminal to cope with the delay spread caused by the wireless channel. Device 600 enables to generate spectrally well-contained projected multi-carrier signals. Device 600 also enables to mitigate distortion caused by the projection with the bandwidth excess and/or the guard data symbols. The zero padding suffix enables low-complex equalization of a time-dispersive channel in absence of a cyclic prefix or tail symbols.

Figure 7:
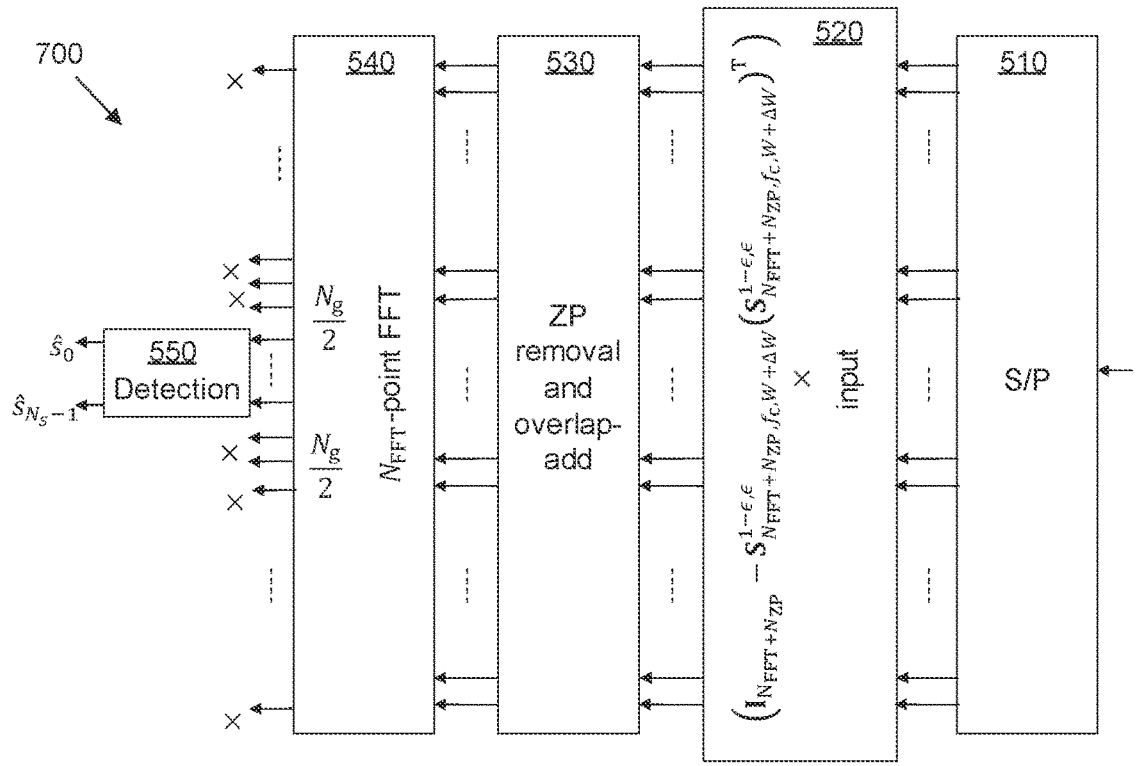
FIG. 7 illustrates an example of a device for receiving a projected multi-carrier signal, according to an embodiment of the present disclosure.

FIG. 7 illustrates an example of a device for receiving a projected multi-carrier signal, according to an embodiment of the present disclosure. Device 700 may be configured to receive the signal generated by the device 600. Therefore, the transmission parameters may take values $\Delta = 0$, $\Delta W \geq 0$ and $N_g > 0$. The OOB interference attenuation module 520 may compute the projection of the received signal for example based on $$(I_{N_{FFT}+N_{ZP}} - S_{N_{FFT}+N_{ZP},f_c,W+\Delta W}^{1-\epsilon,\epsilon}(S_{N_{FFT}+N_{ZP},f_c,W+\Delta W}^{1-\epsilon,\epsilon})^T) \times \text{Input},$$

where Input comprises the window of received samples. Note that device 700 may operate on matrix dimensions that take into account the ZP suffix of $N_{ZP}$ samples. Therefore, the set of DPSS-based sequences used at device 700 as a target for the projection may be of length $N_{FFT}+N_{ZP}$.

The zero prefix may be removed at module 530. For example, an overlap-add operation may be applied to the samples received at the positions of the zero-padding suffix. For example, symbols corresponding to a zero-valued suffix may be overlapped and added with symbols at an opposite edge of the first symbol sequence obtained as output of the OOB interference attenuation module 520. As a consequence, the frequency-domain channel matrix H may become close to diagonal, which enables simple equalization. The receive transform module 540 may comprise an $N_{FFT}$-point IFFT block.

If the values of $\Delta W$ and $N_g$ are large enough, the detection module 550 may be a simple equalizer, where detection is only based on the channel matrix H, for example one-tap equalization based on the entries of the main diagonal of H. The detection module 550 may however also take into account the values of matrices $A_{Tx}$ and $A_{Rx}$ by using a detection method based on the effective channel matrix $H_{eff} \stackrel{def}{=} A_{Rx} H A_{Tx}$, e.g. zero forcing (ZF) $\hat{s}_{ZF} = (H_{eff}^H H_{eff})^{-1} H_{eff}^H y_d$ detection or minimum mean squared error (MMSE) $\hat{s}_{MMSE} = (H_{eff}^H H_{eff} + \sigma^2 I)^{-1} H_{eff}^H y_d$ detection (for some noise-to-signal ratio value $\sigma^2$). Device 700 enables to receive spectrally well-contained projected multi-carrier signals and to mitigate effects of the projection by means of the bandwidth excess and/or the guard band samples.

Figure 8:
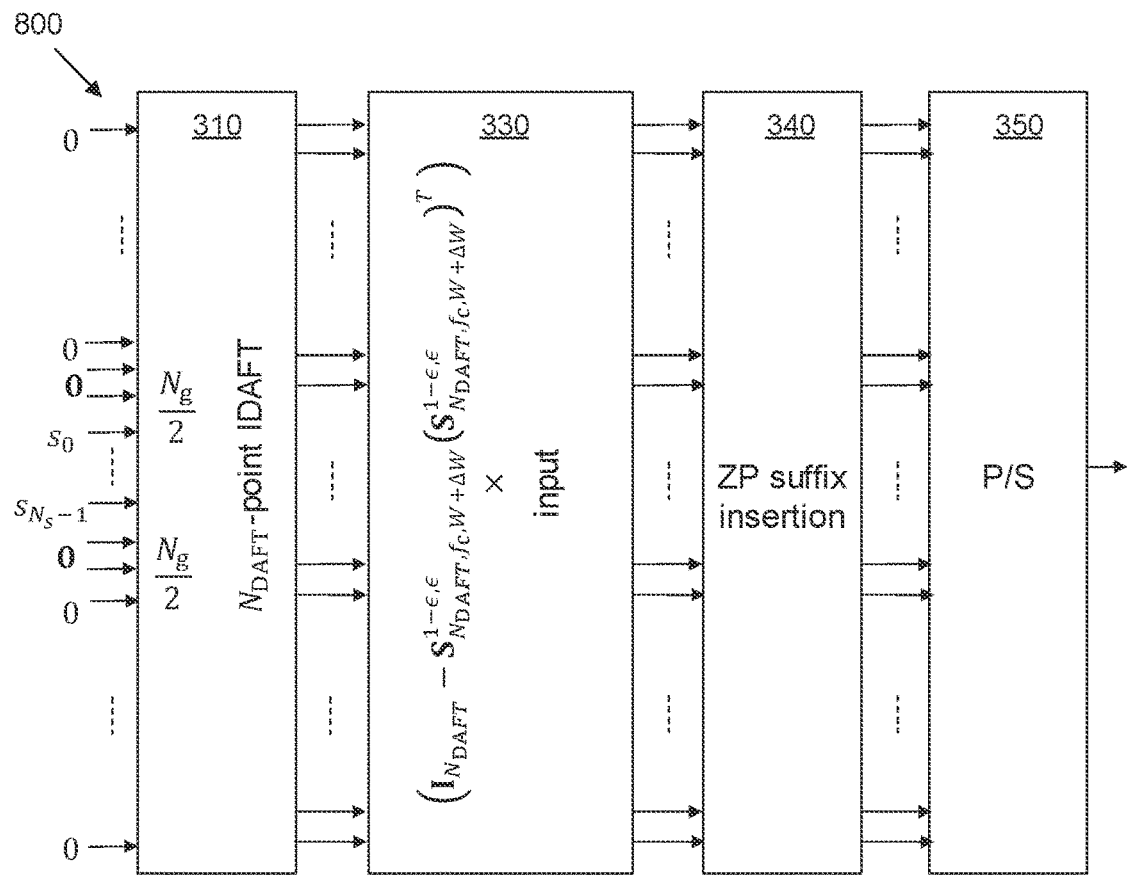
FIG. 8 illustrates an example of a device for generating a signal based on a projection of a multi-chirp signal, according to an embodiment of the present disclosure.

FIG. 8 illustrates an example of a device for generating a signal based on projection of a multi-chirp signal, according to an embodiment of the present disclosure. In this embodiment, the values of the transmission parameters may be $\Delta = 0$, $\Delta W \geq 0$ and $N_g > 0$. The transmit transform module 310 may comprise an $N_{DAFT}$-point IDAFT block the value of N used to apply the projection operations may be therefore $N = N_{DAFT}$. The resulting N samples from each projection operation at the transmitter side may be again optionally zero padded before transmission at module, similar to device 600. The projection may be computed for example based on $$(I_{N_{DAFT}} - S_{N_{DAFT},f_c,W+\Delta W}^{1-\epsilon,\epsilon}(S_{N_{DAFT},f_c,W+\Delta W}^{1-\epsilon,\epsilon})^T) \times \text{Input},$$

where Input comprises the input symbol sequence to the projection module 330, in this example the output of the IDAFT. Device 800 enables to generate spectrally well-contained projected multi-chirp signals. Device 800 also enables to mitigate distortion caused by the projection with the bandwidth excess and/or the guard data symbols. The zero padding suffix enables low-complex equalization of a time-dispersive channel in absence of a chirp periodic prefix or tail symbols.

Figure 9:
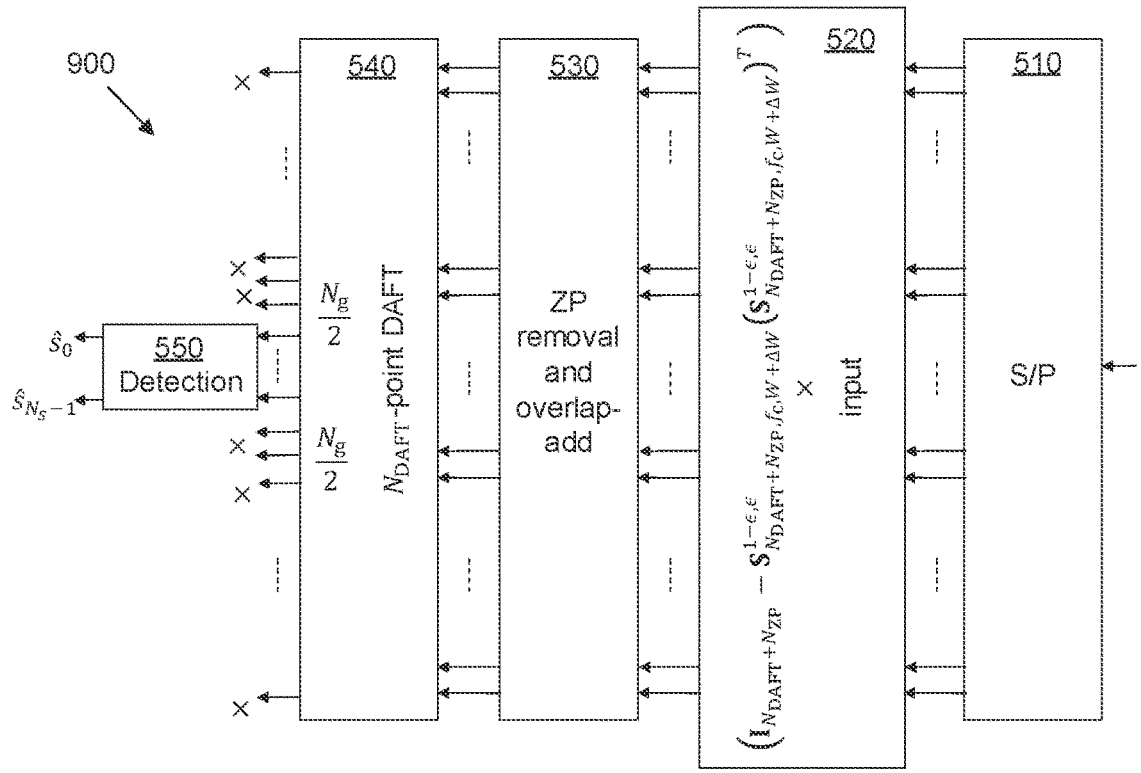
FIG. 9 illustrates an example of a device for receiving a projected multi-chirp signal, according to an embodiment of the present disclosure.

FIG. 9 illustrates an example of a device for receiving a projected multi-chirp signal, according to an embodiment of the present disclosure. Device 900 may be configured to receive the signal generated by the device 800. Therefore, the transmission parameters may take values $\Delta=0$, $\Delta W \geq 0$ and $N_g>0$. The receive transform module 540 may comprise an $N_{DAFT}$-point DAFT block. The OOB interference attenuation module 520 may compute the projection of the received signal for example based on $$(I_{N_{DAFT}+N_{ZP}} - S_{N_{DAFT}+N_{ZP}f_c,W+\Delta W}^{1-\epsilon,\epsilon} (S_{N_{DAFT}+N_{ZP}f_c,W+\Delta W}^{1-\epsilon,\epsilon})^T) \times \text{Input},$$

where Input comprises the window of received samples. Similar to device 700, the device 900 may take into account the ZP suffix of $N_{ZP}$ samples in the matrix dimensions. Therefore, the set of DPSS-based sequences used at device 900 as a target for the projection may be of length $N_{DAFT}+N_{ZP}$. Similar to the device 700, an overlap-add operation can be applied at module 530 to the samples received at the positions of the zero-padding suffix so that the DAFT-domain channel matrix H becomes close to circulant to facilitate simple equalization. If the values of $\Delta W$ and $N_g$ are large enough, the detection module 550 may be a simple equalizer that ignores the effect of the applied projections, for example by using any suitable multi-chirp detection architecture. However, the detection module 550 may also take into account the values of matrices $A_{Tx}$ and $A_{Rx}$, for example by using a detection method based on the effective channel matrix $H_{eff} \stackrel{\text{def}}{=} A_{Rx} H A_{Tx}$ e.g., zero forcing (ZF) $\hat{s}_{ZF}=(H_{eff}^H H_{eff})^{-1} H_{eff}^H y_d$ detection or minimum mean squared error (MMSE) $\hat{s}_{MMSE}=(H_{eff}^H H_{eff}+\sigma^2 I)^{-1} H_{eff}^H y_d$ detection (for some noise-to-signal ratio value $\sigma^2$). Device 900 enables reception of spectrally well-contained projected multi-chirp signals and to mitigate effects of the projection by means of the bandwidth excess and/or the guard band samples.

Figure 10:
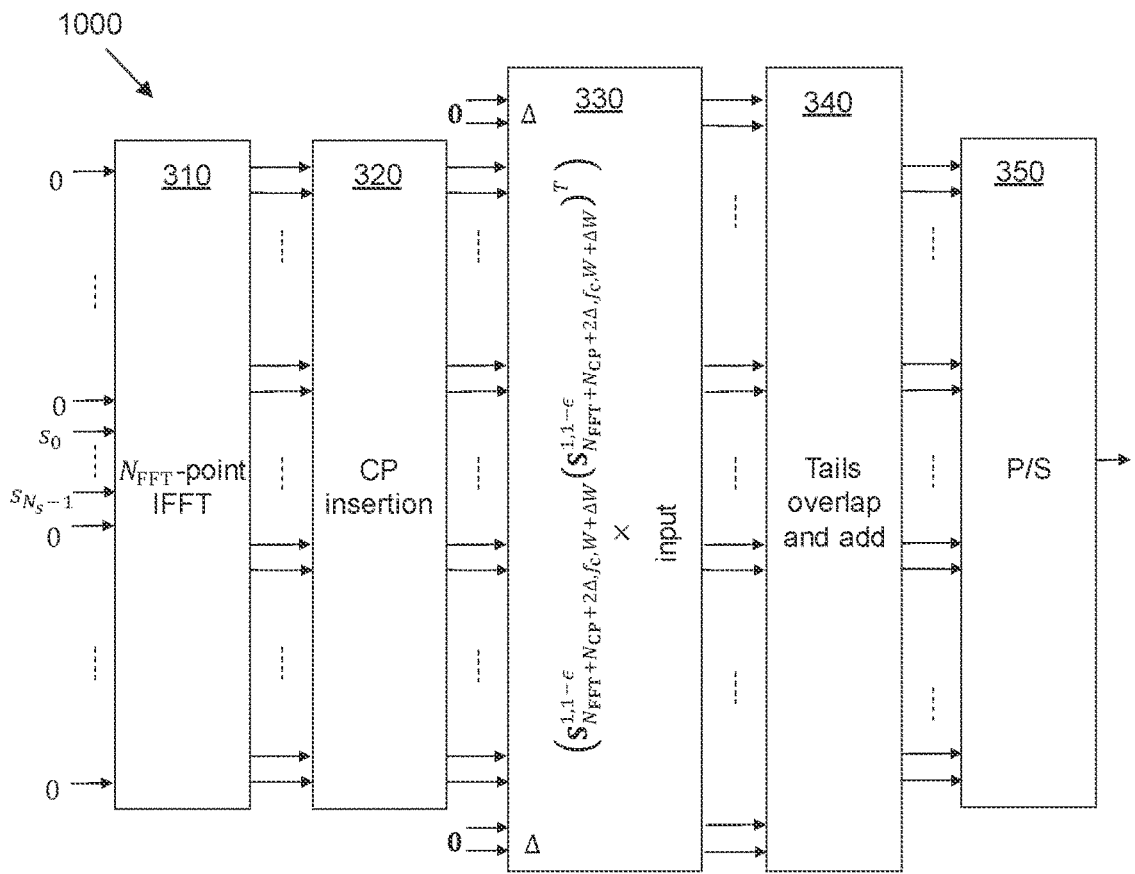
FIG. 10 illustrates an example of a device for generating a signal based on a projection of a multi-carrier signal with overlapping time-domain symbol tails, according to an embodiment of the present disclosure.

FIG. 10 illustrates an example of a device for generating a signal based on projection of a multi-carrier signal with overlapping time-domain symbol tails, according to an embodiment of the present disclosure. In this embodiment, the transmission parameters may take values $\Delta>0$, $\Delta W \geq 0$ and $N_g>0$. The transmit transform module 310 of the device 1000 may comprise an $N_{FFT}$-point IFFT block. The length of the sequence of input symbols, N, used when applying the projection operations at projection module 330 may be $N=N_{FFT}+N_{CP}+2\Delta$ where $N_{CP}$ is the length of the cyclic prefix (CP). An orthogonal projection may be therefore applied to the signal of each OFDM symbol after the insertion of the cyclic prefix at module 320 and after padding the resulting samples with $\Delta$-long zero tails on each side of the resulting symbol sequence at the input of the projection module 330. The projection may be computed for example based on $$(S_{N_{FFT}+N_{CP}+2\Delta,f_c,W+\Delta W}^{1,1-\epsilon} (S_{N_{FFT}+N_{CP}+2\Delta,f_c,W+\Delta W}^{1,1-\epsilon})^T) \times \text{Input},$$

where Input comprises the input symbol sequence to the projection module 330, in this example the output of the cyclic prefix insertion at module 320. The tails of the projected multi-carrier symbol may be overlapped and added at module 340 with previous and subsequent multi-carrier symbols. Device 1000 enables to generate spectrally well-contained projected multi-carrier signals. Device 1000 also enables to mitigate distortion caused by the projection by the bandwidth excess, the guard data symbols, and/or the tail symbols. The cyclic prefix enables low-complex equalization in case of a time-dispersive channel.

Figure 11:
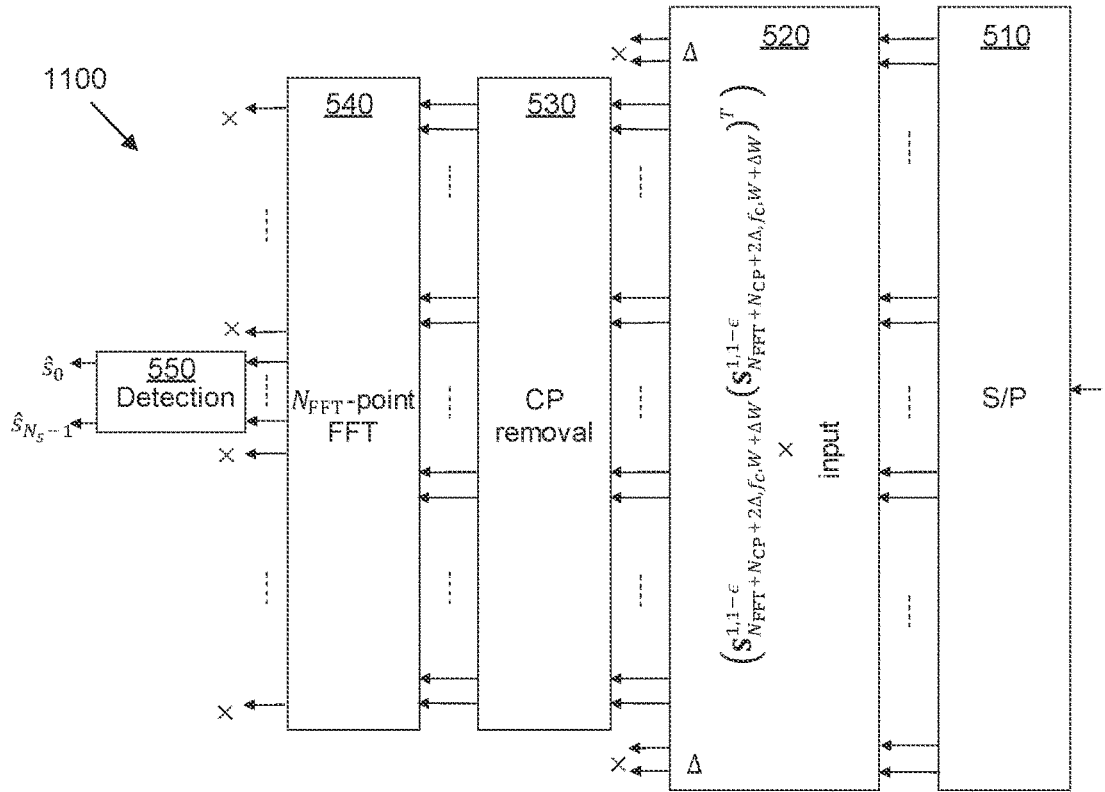
FIG. 11 illustrates an example of a device for receiving a projected multi-carrier signal with overlapping time-domain symbol tails, according to an embodiment of the present disclosure.

FIG. 11 illustrates an example of a device for receiving a projected multi-carrier signal with overlapping time-domain symbol tails, according to an embodiment of the present disclosure. Device 1100 may be configured to receive the signal generated by the device 1000. The transmission parameters may take values $\Delta>0$, $\Delta W \geq 0$ and $N_g>0$. The OOB interference attenuation module 520 may compute the projection of the received signal for example based on $$(S_{N_{FFT}+N_{CP}+2\Delta,f_c,W+\Delta W}^{1,1-\epsilon} (S_{N_{FFT}+N_{CP}+2\Delta,f_c,W+\Delta W}^{1,1-\epsilon})^T) \times \text{Input},$$

where Input comprises the window of received samples. The value of N used at OOB interference attenuation module 520 may be $N=N_{FFT}+N_{CP}+2\Delta$. The receive transform module 540 may comprise an $N_{FFT}$-point FFT. The cyclic prefix may be removed at module 530 to reduce interference between consecutive multi-carrier symbols. Thanks to the use of tail symbols ($\Delta>0$), detection of the data symbols may be done at the detection module 550 (based on the samples at the output of the OOB interference attenuation module 520) while ignoring the effect of the applied projections, for example by using a one-tap frequency-domain equalizer. Device 1100 enables reception of spectrally well-contained projected multi-carrier signals and to mitigate effects of the projection by means of the bandwidth excess, the guard band samples, and/or the tail symbols.

Figure 12:
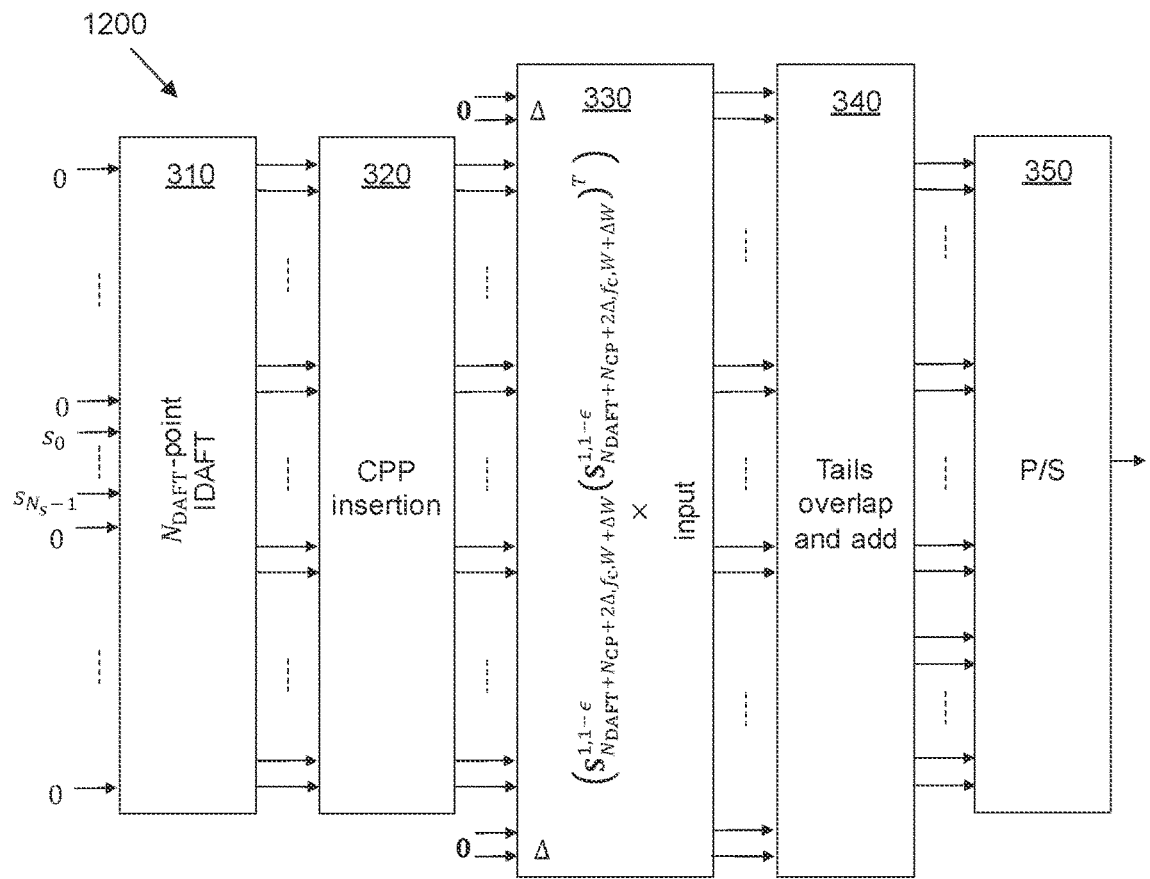
FIG. 12 illustrates an example of a device for generating a signal based on a projection of a multi-chirp signal with overlapping time-domain symbol tails, according to an embodiment of the present disclosure.

FIG. 12 illustrates an example of a device for generating a signal based on projection of a multi-chirp signal with overlapping time-domain symbol tails, according to an embodiment of the present disclosure. In this embodiment, the transmission parameters may take values $\Delta>0$, $\Delta W \geq 0$, and $N_g>0$. The transmit transform module 310 of the device 1200 may comprise an $N_{DAFT}$-point IDAFT block. The length of the sequence of input symbols, N, used when applying the projection operations at projection module 330 may be $N=N_{DAFT}+N_{CPP}+2\Delta$, where $N_{CPP}$ is the length of the chirp periodic prefix. The projection operations may be applied to the time-domain samples of each multi-chirp symbol, which may include the chirp periodic prefix (CPP) samples inserted at module 320. This prefix enables to avoid interference between consecutive multi-chirp symbols. The tails of the projected multi-chirp symbol may be overlapped and added at module 340 with previous and subsequent multi-chirp symbols.

The input samples of the projection module 330 may be padded with $\Delta$-long zero tails on each side of the input symbol sequence. The projection may be computed for example based on $$(S_{N_{DAFT}+N_{CP}+2\Delta,f_c,W+\Delta W}^{1,1-\epsilon} (S_{N_{DAFT}+N_{CP}+2\Delta,f_c,W+\Delta W}^{1,1-\epsilon})^T) \times \text{Input},$$

where Input comprises the input symbol sequence to the projection module 330, for example the output of the CPP insertion at module 320. Device 1200 enables to generate spectrally well-contained projected multi-chirp signals. Device 1200 also enables to mitigate distortion caused by the projection by the bandwidth excess, the guard data symbols, and/or the tail symbols. The chirp periodic prefix enables low-complex equalization in case of a time-dispersive channel.

Figure 13:
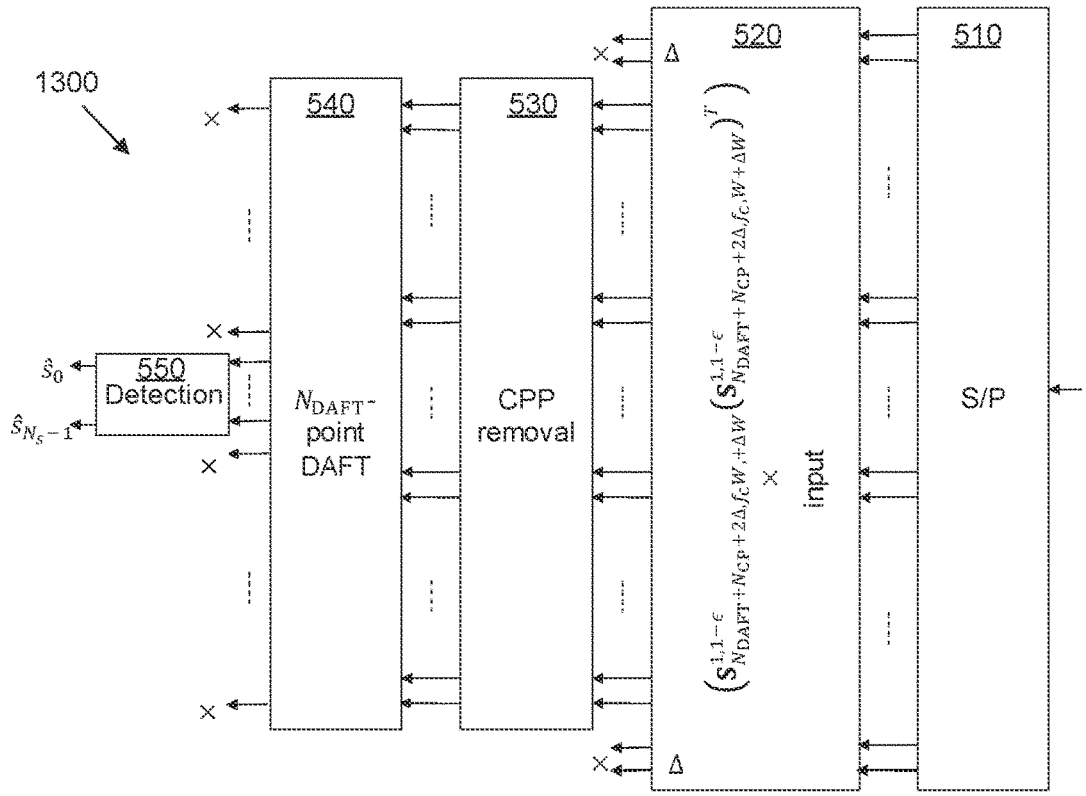
FIG. 13 illustrates an example of a device for receiving a projected multi-chirp signal with overlapping time-domain symbol tails, according to an embodiment of the present disclosure.

FIG. 13 illustrates an example of a device for receiving a projected multi-chirp signal with overlapping time-domain symbol tails, according to an embodiment of the present disclosure. Device 1300 may be configured to receive the signal generated by the device 1100. The transmission parameters may take values $\Delta>0$, $\Delta W \geq 0$ and $N_g>0$. The OOB interference attenuation module 520 may compute the projection of the received signal for example based on $$(S_{N_{DAT}+N_{CP}+2\Delta,f_c,W+\Delta W}^{1,1-\epsilon} (S_{N_{DAFT}+N_{CP}+2\Delta,f_c,W+\Delta W}^{1,1-\epsilon})^T) \times \text{Input},$$

where Input comprises the window of received samples. The value of N used at OOB interference attenuation module 520 may be $N=N_{FFT}+N_{CPP}+2\Delta$. The receive transform module 540 may comprise an $N_{DAFT}$-point DAFT. The chirp periodic prefix may be removed at module 530 to reduce interference between consecutive multi-chirp symbols. Since $\Delta>0$, the detection module 550 may detect the data symbols can be done while ignoring the effect of the applied projections, for example by any suitable multi-chirp detection architecture. Device 1300 enables reception of spectrally well-contained projected multi-chirp signals and to mitigate effects of the projection by means of the bandwidth excess, the guard band samples, and/or the tail symbols.

Figure 14:
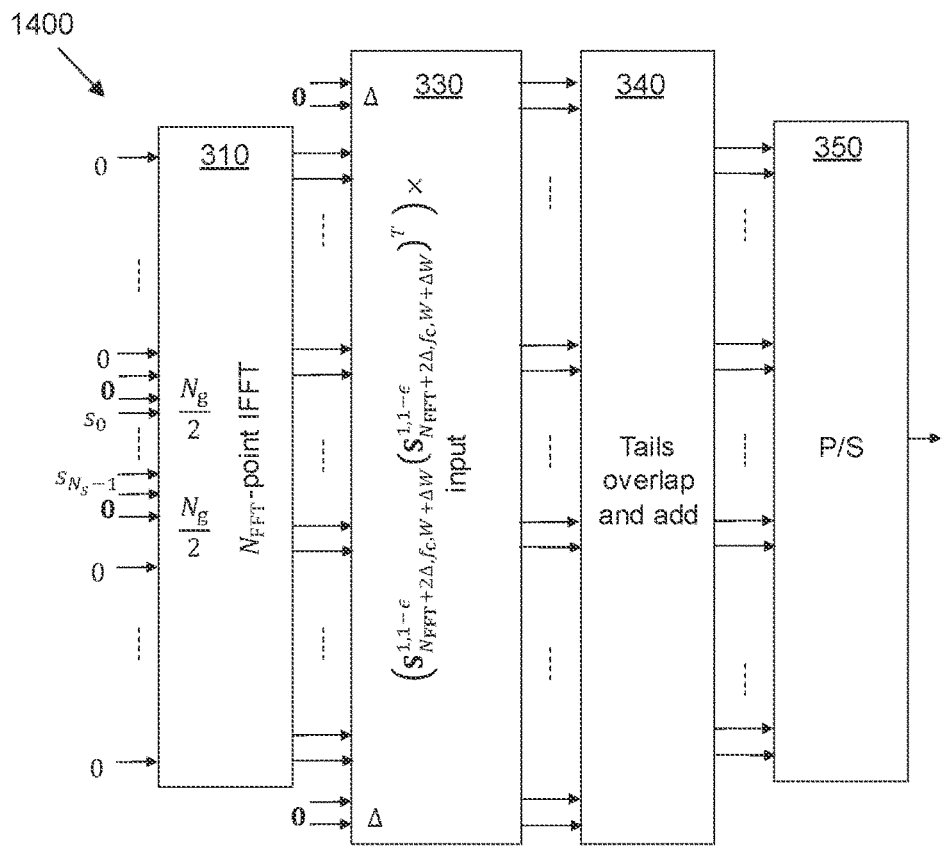
FIG. 14 illustrates an example of a device for generating a signal based on a projection of a single-tone signal with overlapping time-domain symbol tails, according to an embodiment of the present disclosure.

FIG. 14 illustrates an example of a device for generating a signal based on projection of a single-tone signal with overlapping time-domain symbol tails, according to an embodiment of the present disclosure. Single-tone signals may be useful for some application thanks to their low peak-to-average power ratio (PAPR). Single-tone signals may be applied for example in case of internet-of-things (IoT) devices, which may be equipped with low-cost power amplifiers with severe non-linearity impairments that restrict them to transmitting low-PAPR signals. In this embodiment, the transmit transform module 310 of device 1400 may comprise an $N_{FFT}$-point IFFT block. The value of $N_{FFT}$ determines the minimal allowed distance in the frequency domain between two different single-tone signals, because $$\frac{1}{N_{FFT}}$$

is, in this case, the frequency resolution.

To generate a projected single-tone signal, the following set of parameters may be used: $N_s=1$, $\Delta>0$, $\Delta W \geq 0$, and $N_g>0$. The value of $f_c$ used in defining the projection matrices $S_{N,f_c,W+\Delta W}^{1,1-\epsilon}$ and $S_{N,f_c,W+\Delta W}^{1-\epsilon,\epsilon}$ is the frequency of the single tone of the signal while $$W = \frac{N_s + N_g}{N_{FFT}} = \frac{1 + N_g}{N_{FFT}}.$$

The intended bandwidth of the signal may be therefore determined based on the number of guard data symbol and the transform (IFFT) size. The bandwidth excess may be applied with respect to the intended bandwidth. The value of N used when applying the transmit projection operations may be $N=N_{FFT}+2\Delta$, if no cyclic prefix is added to the symbol. The projection may be computed for example based on $$(S_{N_{FFT}+2\Delta,f_c,W+\Delta W}^{1,1-\epsilon} (S_{N_{FFT}+2\Delta,f_c,W+\Delta W}^{1,1-\epsilon})^T) \times \text{Input},$$

where Input comprises the input symbol sequence to the projection module 330, for example the output of the $N_{FFT}$-point IFFT. It is noted that several single-tone signals with different $f_c$ may be transmitted. A plurality of projected single-tone signals may be therefore generated based on a plurality of sets of sequences that are based on DPSSs subject to different frequency shifts. The tails of the projected single-tone symbols may be overlapped and added at module 340 with previous and subsequent projected single-tone symbols. Device 1400 enables to generate spectrally well-contained projected single-tone signals. Device 1200 also enables to mitigate distortion caused by the projection by the bandwidth excess, the guard data symbols, and/or the tail symbols.

Figure 15:
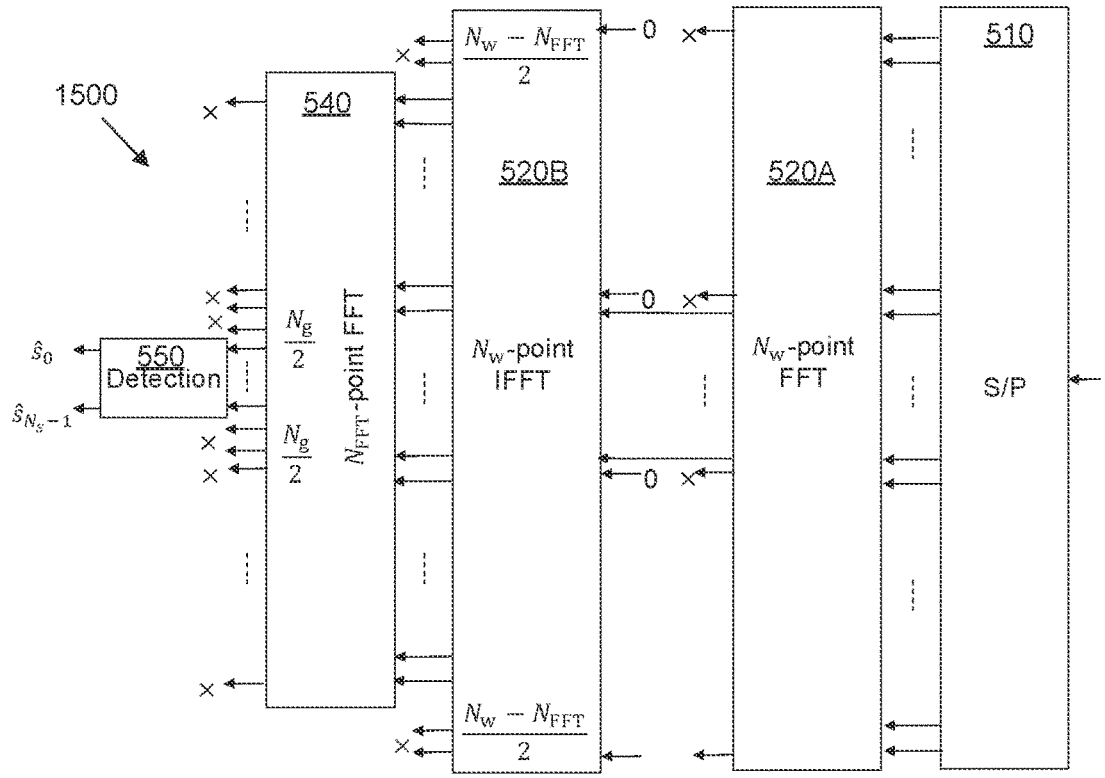
FIG. 15 illustrates an example of a device for receiving a projected single-tone signal with overlapping time-domain symbol tails, according to an embodiment of the present disclosure.

FIG. 15 illustrates an example of a device for receiving a projected single-tone signal with overlapping time-domain symbol tails, according to an embodiment of the present disclosure. Device 1500 may be configured to receive the signal generated by the device 1400. The transmission parameters may take therefore values $N_s=1$, $\Delta>0$, $\Delta W \geq 0$, and $N_g>0$. The receive transform 540 may comprise an $N_{FFT}$-point FFT. Due to a potentially large number of interfering single-tone signals, the out-of-band interference attenuation module 520 may be implemented using a frequency domain filtering method. The OOB interference attenuation module 520 may therefore comprise a concatenation of an $N_w$-point FFT 520A and an $N_w$-point IFFT 520B. $N_w$ may denote the length of the window of received symbols (receive processing window) and N, may be larger than the size of the receive transform size, $N_w>N$ (in this example $N=N_{FFT}$). Indeed, as opposed to the projection which might need to be repeated for each interfering single-tone signal (because of its dependence on the value of the tone frequency $f_c$), the frequency domain filtering may be common to all the interfering tones. What changes from one tone to another is only the index of the sub-carriers to be discarded. Symbols corresponding to interfering single-tone signals may be set to zero at the output of the $N_w$-point FFT 520A. This filtering may applied to a processing window length value satisfying $N_w>N_{FFT}+2\Delta$, for example because transmissions by IoT devices may be asynchronous. The OOB interference attenuation processing window length $N_w$ may be therefore made larger to account for this asynchronicity. Device 1500 enables reception of spectrally well-contained projected single-tone signals and to mitigate effects of the projection by means of the bandwidth excess, the guard band samples, and/or the tail symbols.

The example embodiments of the present disclosure provide a system and a method applicable at transmitter 110 to synthesize a data-carrying signal to be transmitted on a frequency sub-band of width $2W \in (0,1)$ (in normalized frequencies i.e., frequencies in the discrete-time Fourier transform (DTFT) domain) centered on $f_c \in (0,1)$, of a multi-carrier, multi-chirp or single-tone transmission system. Based on data symbols subject to transmission, a multi-carrier, multi-chirp or single-tone signals that occupies in the DTFT domain the normalized frequency sub-band $(f_c-W, f_c+W)$ may be generated using any suitable method, for example IFFT or IDAFT. In some embodiments of multi-carrier or multi-chirp signals, a number $N_g>0$ ('g' for 'guard') of sub-carriers or chirps may be set to zero. Time-domain samples of each (multi-carrier, multi-chirp, or single-tone) symbol may be padded with $2\Delta$ zero samples, e.g. $\Delta>0$ samples on each side, to get a sequence x of N samples. A precision parameter $\epsilon \in (0, \frac{1}{2})$ and a bandwidth excess parameter $\Delta W \geq 0$ may be chosen.

A matrix $S_{N,f_c,W+\Delta W}^{1,1-\epsilon}$ may be generated, for example based direct computation or look-up tables. This matrix may comprise the $f_c$-modulated columns $0 \leq l \leq N-1$ of the Slepian basis matrix $S_{N,W+\Delta W}$ with eigenvalues $\lambda_{N,W+\Delta W}^{(l)}$ (w.r.t. the corresponding prolate matrix) satisfying $1 \geq \lambda_{N,W+\Delta W}^{(l)} > 1-\epsilon$ and computing $S_{N,f_c,W+\Delta W}^{1,1-\epsilon}(S_{N,f_c,W+\Delta W}^{1,1-\epsilon})^T x$ the projection of x on the span of the columns of $\Delta W$. Alternatively, an approximation of the above linear projection may be computed, for example, by generating, using direct computation or look-up tables, a matrix $S_{N,f_c,W+\Delta W}^{1-\epsilon,\epsilon}$ comprising the $f_c$-modulated columns $0 \leq l \leq N-1$ of the Slepian basis matrix $S_{N,W+\Delta W}$ with eigenvalues $\lambda_{N,W+\Delta W}^{(l)}$ (with respect to the corresponding prolate matrix) satisfying $\epsilon \leq \lambda_{N,W+\Delta W}^{(l)} \leq 1-\epsilon$. The approximation of the projection may be then computed by $x - S_{N,f_c,W+\Delta W}^{1-\epsilon,\epsilon}(S_{N,f_c,W+\Delta W}^{1-\epsilon,\epsilon})^T x$.

In embodiments with $\Delta > 0$, the final signal time-domain samples may be generated by overlapping the $\Delta$ samples of the left-side tail of each symbol with the last A time-domain samples of the preceding symbol and the $\Delta$ samples of the right-side tail with the first A time-domain samples of the next symbol before adding the corresponding values of the overlapping samples. Signalling information comprising the values of all or a subset of the parameters $\epsilon$, A, $N_g$ and $\Delta W$ may be transmitted to the receiving terminal(s), for example using control messages.

The example embodiments of the present disclosure also provide a system and a method applicable at receiver 130 to process received samples. A receive processing window of length $N_w \geq N$ samples ('w' for 'window') centered sequentially on the time-domain samples of each (multi-carrier, multi-chirp, or single-tone) symbol may be determined to get the $N_w$-long vector y of received samples. Multi-user out-of-band interference may be attenuated by a projection computed for example by $S_{N_w,f_c,W+\Delta W}^{1,1-\epsilon}(S_{N_w,f_c,W+\Delta W}^{1,1-\epsilon})^T y$. Alternatively, an approximation of the above orthogonal projection may be computed, for example by $y - S_{N_w,f_c,W+\Delta W}^{1-\epsilon,\epsilon}(S_{N_w,f_c,W+\Delta W}^{1-\epsilon,\epsilon})^T y$. An approximation of the effect of the above projection may be also computed based on the $N_w$-point FFT of y, setting to zero the $N_w$-point DFT frequency domain samples corresponding to the sub-bands of the interfering signals and to the position of the $N_g$ null guard sub-carriers (in embodiments with a multi-carrier transmission and with $N_g > 0$), and applying $N_w$-point IFFT to the resulting samples. Yet another approximation of the effect of the above projection may be performed by applying a filtering operation to the received signal using any suitable filter with a passband covering the interval $(f_c - W, f_c + W)$ in normalized frequencies. An estimate of the transmitted data symbols within the current (multi-carrier, multi-chirp or single-tone) symbol may be determined using an appropriate detection algorithm, which may optionally compensate for the effect on the end-to-end signal model of the projection on the span of the columns of the matrix $S_{N,f_c,W+\Delta W}^{1,1-\epsilon}$ at the transmitter 110 and of the matrix $S_{N_w,f_c,W+\Delta W}^{1,1-\epsilon}$ at the receiver 130, to compensate for the effect of the disclosed approximations of these two projection operations. The value of the parameter $N_w$ used by the receiver 130, or an upper bound on this value, which may be dictated by the complexity constraints of the receiver 130 terminal, may be signalled to the transmitter 110. This enables the transmitter 110 to adapt the values of all or a subset of the parameters $\epsilon$, $\Delta$, $N_g$ and $\Delta W$ used in generating the transmitted signal.

The embodiments of the present disclosure, enable to generate multi-carrier, multi-chirp, or single-tone communications signals with much lower out-of-band emission (OOBE) levels compared to for example windowing or filtering based approaches, when applied to the same signal. The low level of OOBE helps to guarantee that the generated signal is compatible with power spectral masks imposed by standards with no or short guard bands between neighbouring signals. The embodiments also reduce multi-user interference (among transmissions occupying neighbouring frequency sub-bands), which may be useful for example in case of asynchronous-transmission, carrier frequency offset (CFO), or mobility and/or multi-numerology scenarios. Indeed, in these scenarios, a signal transmitted on a frequency sub-band, while having OOBE levels outside that sub-band that are not low enough, could generate prohibitively high level of interference to the signals occupying neighbouring frequency sub-bands. This may be avoided by applying the disclosed projected signals.

Furthermore, when applying the disclosed projection methods to generate single-tone signals with very steep frequency responses, the resulting signals may have both low peak-to-average power ratio (PAPR), because single-tone signals have low PAPR, and low OOBE levels, because of the applied orthogonal projections. The low OOBE levels may thus help to ensure very low multi-user interference, for example in case of asynchronous-transmission, CFO, or mobility or multi-numerology scenarios. This feature may be applied for example for IoT devices, which may be equipped with low-complexity power amplifiers that can cause severe aliasing if not used to transmit low-PAPR signals. The above advantages may be achieved with much lower computational complexity and without significantly reducing the associated transmission performance when the disclosed projection operation is replaced with its lower-complexity approximation also described above.

Figure 16:
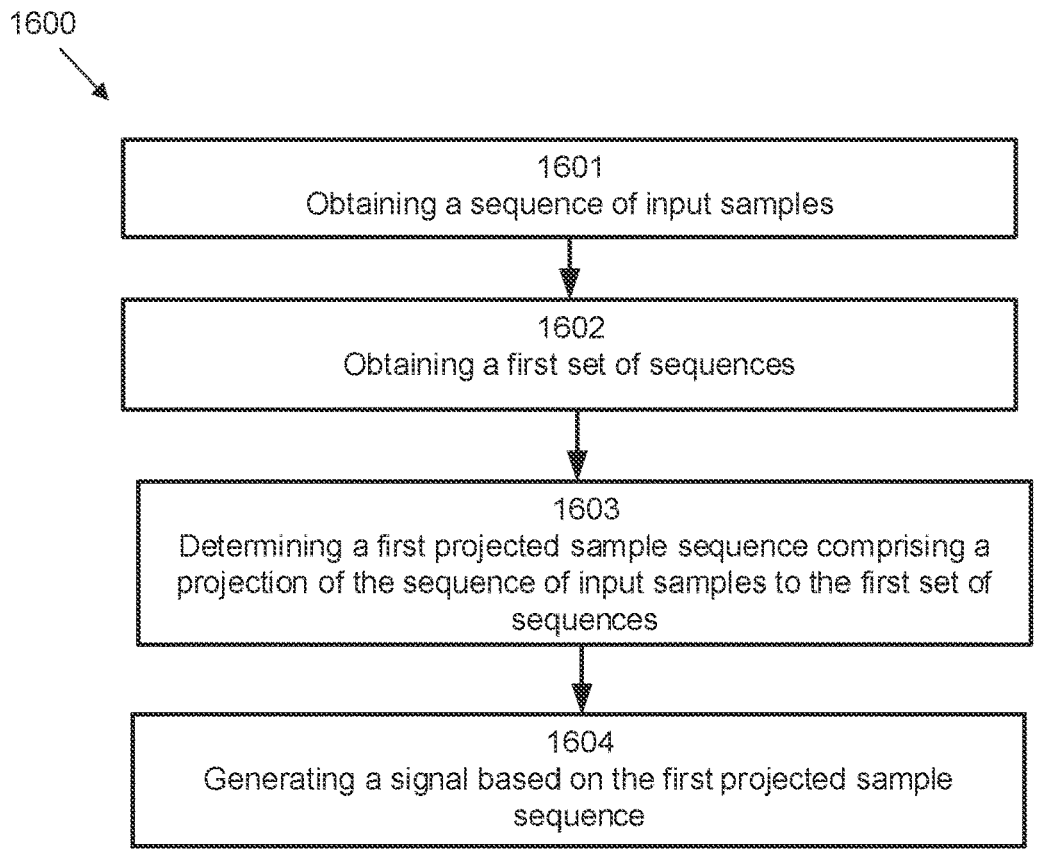
FIG. 16 illustrates an example of a method for generating a signal, according to an embodiment of the present disclosure.

FIG. 16 illustrates an example of a method 1600 for generating a signal, according to an embodiment of the present disclosure.

At 1601, the method may comprise obtaining a sequence of input samples.

At 1602, the method may comprise obtaining a first set of sequences. The first set of sequences may be based on discrete prolate spheroidal sequences associated with eigenvalues having a value larger than a first threshold.

At 1603, the method may comprise determining a first projected sample sequence comprising a projection of the sequence of input samples to the first set of sequences.

At 1604, the method may comprise generating the signal based on the first projected sample sequence.

Figure 17:
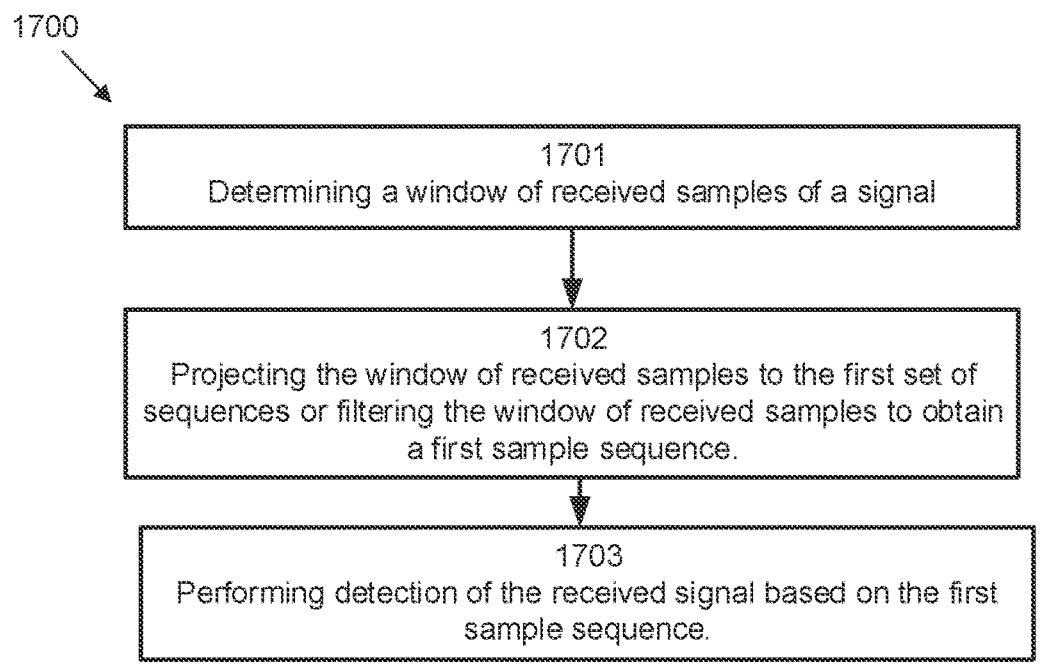
FIG. 17 illustrates an example of a method for receiving a signal, according to an embodiment of the present disclosure.

FIG. 17 illustrates an example of a method 1700 for receiving a signal, according to an embodiment of the present disclosure.

At 1701, the method may comprise determining a window of received samples of a signal. The signal may comprise a projection of a sequence of input samples to a first set of sequences. The first set of sequences may be based on discrete prolate spheroidal sequences associated with eigenvalues having a value larger than a first threshold.

At 1702, the method may comprise projecting the window of received samples to the first set of sequences or filtering the window of received samples to obtain a first sample sequence.

At 1703, the method may comprise performing detection of the received signal based on the first sample sequence.

Further features of the methods directly result from the functionalities and parameters of the methods and devices, for example the transmitter 110, the receiver 130, or any of devices 200, 300, 500, 600, 700, 800, or 900 as described in the appended claims and throughout the specification and are therefore not repeated here.

A device or a system may be configured to perform or cause performance of any aspect of the method(s) described herein. Further, a computer program may comprise program code configured to cause performance of an aspect of the method(s) described herein, when the computer program is executed on a computer. Further, the computer program product may comprise a computer readable storage medium storing program code thereon, the program code comprising instruction for performing any aspect of the method(s) described herein. Further, a device may comprise means for performing any aspect of the method(s) described herein. According to an example embodiment, the means comprises at least one processor, and at least one memory including program code, the at least one processor, and program code configured to, when executed by the at least one processor, cause performance of any aspect of the method(s).

The functions and modules of any of devices 300, 500, 600, 700, 800, or 900 may be implemented by any suitable means, for example similar to device 200. Hence, any of the devices 300, 500, 600, 700, 800, or 900 may comprise necessary software and/or hardware, such as for example processing circuitry and/or memory, for implementing said functions or modules.

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items. Furthermore, references to 'at least one' item or 'one or more' items may refer to one or a plurality of those items.

The operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or device may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. A device for generating a signal, comprising:
a memory;
at least one processor coupled to the memory and configured to:
obtain a sequence of input samples;
obtain a first set of sequences, wherein the first set of sequences is based on discrete prolate spheroidal sequences associated with eigenvalues having a value larger than a first threshold;
determine a first projected sample sequence comprising a projection of the sequence of input samples to the first set of sequences; and
generate the signal based on the first projected sample sequence.

2. The device according to claim 1, wherein at least one processor is configured to:
obtain a second set of sequences, wherein the second set of sequences is based on discrete prolate spheroidal sequences associated with eigenvalues having a value between the first threshold and a second threshold,
determine a second projected sample sequence comprising a projection of the sequence of input samples to the second set of sequences; and
subtract the second projected sample sequence from the sequence of input samples.

3. The device according to claim 2, wherein the first threshold is $1-\epsilon$ and the second threshold is $\epsilon$, where $\epsilon$ is between 0 and ½.

4. The device according to claim 2, wherein the first set of sequences or the second set of sequences comprises frequency-shifted discrete prolate spheroidal sequences.

5. The device according to claim 1, wherein the discrete prolate spheroidal sequences comprise eigenvectors of a prolate matrix $B_{N,W}$, where elements (m, n) of the prolate matrix $B_{N,W}$ are:

$$[B_{N,W}]_{m,n} = \frac{\sin 2\pi W(m-n)}{\pi(m-n)},$$

where $(m, n) \in \{1, \ldots, N\}^2$, N is a length of the sequence of input samples, and W is an intended bandwidth of the signal, where W is between 0 and ½.

6. The device according to claim 1, wherein a bandwidth of the first set of sequences comprises a bandwidth excess with respect to an intended bandwidth of the signal.

7. The device according to claim 6, wherein the discrete prolate spheroidal sequences comprise eigenvectors of a prolate matrix $B_{N,W+\Delta W}$, where elements (m, n) of the prolate matrix $B_{N,W+\Delta W}$ are:

$$[B_{N,W+\Delta W}]_{m,n} = \frac{\sin 2\pi(W+\Delta W)(m-n)}{\pi(m-n)},$$

where $(m, n) \in \{1, \ldots, N\}^2$, N is a length of the sequence of input samples, W is the intended bandwidth of the signal, where W is between 0 and ½, and $\Delta W$ is the bandwidth excess.

8. The device according to claim 1, wherein at least one processor is configured to apply a transmit transform to a sequence of data symbols to obtain the sequence of input samples.

9. The device according to claim 8, wherein the transmit transform comprises an inverse discrete Fourier transform or an inverse discrete affine Fourier transform.

10. The device according to claim 8, wherein the sequence of data symbols comprises guard symbols at edges of the sequence of data symbols.

11. The device according to claim 1, wherein at least one processor is configured to insert a cyclic prefix or a chirp periodic prefix to the sequence of input samples.

12. The device according to claim 1, wherein at least one processor is configured to insert zero-valued tail samples at edges of the sequence of input samples.

13. The device according to claim 12, wherein at least one processor is configured to overlap and add tails of the first projected sample sequence with a preceding projected sequence of input samples and a subsequent projected sequence of input samples.

14. The device according to claim 1, wherein at least one processor is configured to insert a zero-valued suffix to the first projected sample sequence.

15. The device according to claim 6, wherein at least one processor is configured to transmit at least one of:
- an indication of the bandwidth excess;
- an indication of a number of guard symbols; and
- an indication of a number of zero-valued tail samples.

16. The device according to claim 15, wherein at least one processor is configured to:
- receive an indication of a length of a window of received samples configured at a receiver; and
- determine at least one of the bandwidth excess, the number of the guard symbols, and the number of the zero-valued tail symbols based on the length of the window of received samples configured at the receiver.

17. The device according to claim 1, wherein at least one processor is configured to transmit the generated signal.

18. A device for receiving a signal, comprising:
a memory;
at least one processor coupled to the memory and configured to:
determine a window of received samples of the received signal, wherein the received signal comprises a projection of a sequence of input samples to a first set of sequences, wherein the first set of sequences is based on discrete prolate spheroidal sequences associated with eigenvalues having a value larger than a first threshold;
project the window of received samples to the first set of sequences or filter the window of received samples to obtain a first sample sequence; and
perform a detection of the received signal based on the first sample sequence.

19. The device according to claim 18, wherein the at least one processor is configured to:
determine a second projected sample sequence comprising a projection of the window of received samples to a second set of sequences, wherein the second set of sequences is based on discrete prolate spheroidal sequences associated with eigenvalues having a value between the first threshold and a second threshold; and
subtract the second projected sample sequence from the window of received samples.

20. A method for generating a signal, the method comprising:
obtaining a sequence of input samples;
obtaining a first set of sequences, wherein the first set of sequences is based on discrete prolate spheroidal sequences associated with eigenvalues having a value larger than a first threshold;
determining a first projected sample sequence comprising a projection of the sequence of input samples to the first set of sequences; and
generating the signal based on the first projected sample sequence.

* * * * *